(12) United States Patent  
Murata et al.

(10) Patent No.: US 10,405,127 B2  
(45) Date of Patent: Sep. 3, 2019

(54) MEASUREMENT DEVICE, FILTER GENERATION DEVICE, MEASUREMENT METHOD, AND FILTER GENERATION METHOD

(71) Applicant: JVC KENWOOD Corporation, Yokohama-shi, Kanagawa (JP)

(72) Inventors: Hisako Murata, Yokohama (JP); Masaya Konishi, Yokohama (JP); Yumi Fujii, Yokohama (JP)

(73) Assignee: JVCKENWOOD Corporation, Yokohama-shi, Kanagawa (JP)

( * ) Notice: Subject to any disclaimer, the term of this patent is extended or adjusted under 35 U.S.C. 154(b) by 0 days.

(21) Appl. No.: 16/126,803

(22) Filed: Sep. 10, 2018

(65) Prior Publication Data

US 2019/0007784 A1 Jan. 3, 2019

Related U.S. Application Data

(63) Continuation of application No. PCT/JP2017/001950, filed on Jan. 20, 2017.

(30) Foreign Application Priority Data

Mar. 10, 2016 (JP) .................................. 2016-047265

(51) Int. Cl.
*H04S 7/00* (2006.01)
*G01H 17/00* (2006.01)
(Continued)

(52) U.S. Cl.
CPC .............. *H04S 7/304* (2013.01); *G01H 3/12* (2013.01); *G01H 17/00* (2013.01); *G10K 15/00* (2013.01);
(Continued)

(58) Field of Classification Search
CPC . H04S 7/00; H04S 1/005; H04S 1/007; H04S 2420/01; G01H 3/12
(Continued)

(56) References Cited

U.S. PATENT DOCUMENTS 6,928,179 B1 8/2005 Yamada et al.
2006/0045294 A1 3/2006 Smyth
(Continued)

FOREIGN PATENT DOCUMENTS

JP H-05210393 A 8/1993
JP 2008512015 A 4/2008
(Continued)

OTHER PUBLICATIONS

Wang et al. "An "out of head" sound field enhancement system for headphone" International Conference on Neural Networks and Signal Processing, Jun. 1, 2008; pp. 517-521 (6 pages).

*Primary Examiner* — Melur Ramakrishnaiah
(74) *Attorney, Agent, or Firm* — Procopio, Cory, Hargreaves & Savitch LLP

(57) ABSTRACT

A measurement device according to this embodiment includes a peak detection unit that detects positive and negative peaks included in a sound pickup signal, a sign determination unit that determines a positive or negative sign based on amplitudes at the negative and positive peaks detected by the peak detection unit, a peak group separation unit that separates a peak sequence composed of the peaks with the determined sign into a plurality of peak groups, a maximum amplitude detection unit that detects a maximum amplitude in each of the plurality of peak groups, a signal cutout unit that cuts out the sound pickup signal at cutout timing based on the maximum amplitude and generates a plurality of cutout signals, and a signal adding unit that adds the plurality of cutout signals.

7 Claims, 23 Drawing Sheets

(51) Int. Cl.
  *G10K 15/00* (2006.01)
  *H04R 3/00* (2006.01)
  *H04S 5/02* (2006.01)
  *G01H 3/12* (2006.01)

(52) U.S. Cl.
  CPC .............. *H04R 3/00* (2013.01); *H04S 5/02* (2013.01); *H04S 2400/01* (2013.01)

(58) Field of Classification Search
  USPC .............. 381/309, 16, 17, 26, 303–308, 310
  See application file for complete search history.

(56) References Cited

U.S. PATENT DOCUMENTS

| | | |
|---|---|---|
| 2006/0274901 A1* | 12/2006 | Terai .................. H04S 1/005 381/17 |
| 2008/0144839 A1 | 6/2008 | Yoshino et al. |
| 2010/0241256 A1* | 9/2010 | Goldstein .............. H04R 5/04 700/94 |
| 2011/0305358 A1 | 12/2011 | Nishio et al. |
| 2012/0063605 A1 | 3/2012 | Tawada et al. |
| 2013/0177057 A1 | 7/2013 | Martynovich et al. |
| 2013/0336490 A1* | 12/2013 | Someda ................. H04R 5/00 381/17 |

FOREIGN PATENT DOCUMENTS

| | | |
|---|---|---|
| JP | 4184420 B2 | 11/2008 |
| WO | 2014/168369 A1 | 10/2014 |

\* cited by examiner

MEASUREMENT DEVICE, FILTER GENERATION DEVICE, MEASUREMENT METHOD, AND FILTER GENERATION METHOD

CROSS REFERENCE TO RELATED APPLICATION

This application is a bypass continuation of International Application No. PCT/JP2017/001950 filed on Jan. 20, 2017 which is based upon and claims the benefit of priority from Japanese Patent Application No. 2016-047265 filed on Mar. 10, 2016, the disclosure of which is incorporated herein in its entirety by reference.

BACKGROUND

The present invention relates to a measurement device, a filter generation device, a measurement method, and a filter generation method.

Sound localization techniques include an out-of-head localization technique, which localizes sound images outside the head of a listener by using headphones. The out-of-head localization technique localizes sound images outside the head by canceling characteristics from the headphones to the ears and giving four characteristics from stereo speakers to the ears.

In out-of-head localization reproduction, measurement signals (impulse sounds etc.) that are output from 2-channel (which is referred to hereinafter as "ch") speakers are recorded by microphones (which can be also called "mike") placed on the listener's ears. Then, a head-related transfer function is calculated based on impulse response, and a filter is generated. The generated filter is convolved to 2-ch audio signals, thereby implementing out-of-head localization reproduction.

Patent Literature 1 (Published Japanese Translation of PCT International Publication for Patent Application, No. 2008-512015) discloses a method for acquiring a set of personalized room impulse responses. In Patent Literature 1, microphones are placed near the ears of a listener. Then, the left and right microphones record impulse sounds when driving speakers.

SUMMARY

Measurement has been carried out by using a special measurement room in which a sound source such as speakers is placed and using special equipment. However, with an increase in memory capacity and operation speed in recent years, it has become possible for a listener to carry out impulse response measurement by using a personal computer (PC) or the like. In the case where a listener carries out impulse response measurement by using a PC or the like, the following problems can occur.

The impulse response measurement process carries out impulse response measurement a plurality of times under the same conditions and then performs synchronous addition of the measured signals in order to improve the S/N ratio (Patent Literature 2: Japanese Patent No. 4184420). When performing synchronous addition, it is necessary to synchronize the timing to output a measurement signal from speakers and the timing to pick up the measurement signal by microphones in each measurement.

In typical acoustic devices for PC, input and output clocks are synchronous. Therefore, once measurement is started, the amount of delay in the device does not change until it is stopped. Thus, when a measurement signal containing a certain signal sound (impulse sound) is output, the signal sound is picked up by microphones with a certain amount of delay. When repeated reproduction is carried out so as to periodically output signal sounds, the signal sounds are generally output in a fixed period.

However, if a low-cost acoustic device is used, there is a case where the amount of delay in each signal sound is different even when the signal sounds are output periodically. This causes an issue that the signal sounds are not reproduced in a constant period. This is because, for example, multitask control does not prioritize acoustic devices, and therefore sounds are output after executing other tasks. Thus, there is a problem that it is not possible to perform synchronous addition, which is absolutely necessary for measurement, and not possible to achieve accurate measurement of transfer characteristics.

The present embodiment has been accomplished to solve the above problems and an object of the present disclosure is thus to provide a measurement device, a filter generation device, a measurement method and a filter generation method that are capable of appropriately measuring transfer characteristics.

A measurement device according to one aspect of the present disclosure includes a measurement unit configured to measure transfer characteristics based on a sound pickup signal, the sound pickup signal being acquired by picking up, using a microphone, a measurement signal output from a sound source, the measurement signal containing a plurality of signal sound in a row with a time interval, wherein the measurement unit includes: a peak detection unit configured to detect positive and negative peaks included in a sound pickup signal; a sign determination unit configured to determine a positive or negative sign based on amplitudes at the negative and positive peaks detected by the peak detection unit; a separation unit configured to separate a peak sequence composed of the peaks with the determined sign into a plurality of peak groups; a maximum amplitude detection unit configured to detect a maximum amplitude in each of the plurality of peak groups; a cutout unit configured to cut out the sound pickup signal at cutout timing based on the maximum amplitude and generate a plurality of cutout signals; and a signal adding unit configured to add the plurality of cutout signals.

A measurement method according to one aspect of the present disclosure is a measurement method that measures transfer characteristics by picking up, using a microphone, a measurement signal output from a sound source, the method including: a step of outputting, from the sound source, a measurement signal containing a plurality of signal sounds in a row with a time interval; a step of picking up, by the microphone, the measurement signal output from the speakers and acquiring a sound pickup signal; a peak detection step of detecting positive and negative peaks included in the sound pickup signal; a sign determination step of determining a positive or negative sign based on amplitudes at the negative and positive peaks; a separation step of separating a peak sequence composed of the peaks with the determined sign into a plurality of peak groups; a maximum amplitude detection step of detecting a maximum amplitude in each of the plurality of peak groups; a cutout step of cutting out the sound pickup signal at cutout timing based on the maximum amplitude and generating a plurality of cutout signals; and a signal adding step of adding the plurality of cutout signals.

According to the embodiment, it is possible to provide a measurement device, a filter generation device, a measurement method and a filter generation method that are capable of appropriately measuring transfer characteristics.

DETAILED DESCRIPTION

In this embodiment, a measurement device measures transfer characteristics from speakers to microphones. Then, a filter generation device generates a filter based on the transfer characteristics measured by the measurement device.

The overview of a sound localization process using a filter generated by a filter generation device according to an embodiment is described hereinafter. An out-of-head localization process, which is an example of a sound localization device, is described in the following example. The out-of-head localization process according to this embodiment performs out-of-head localization by using personal spatial acoustic transfer characteristics (which is also called a spatial acoustic transfer function) and ear canal transfer characteristics (which is also called an ear canal transfer function). In this embodiment, out-of-head localization is achieved by using the spatial acoustic transfer characteristics from speakers to a listener's ears and the ear canal transfer characteristics when headphones are worn.

In this embodiment, the ear canal transfer characteristics, which are characteristics from a headphone speaker unit to the entrance of the ear canal when headphones are worn are used. By carrying out convolution with use of the inverse characteristics of the ear canal transfer characteristics (which are also called an ear canal correction function), it is possible to cancel the ear canal transfer characteristics.

An out-of-head localization device according to this embodiment is an information processor such as a personal computer, a smart phone, a tablet PC or the like, and it includes a processing means such as a processor, a storage means such as a memory or a hard disk, a display means such as a liquid crystal monitor, an input means such as a touch panel, a button, a keyboard and a mouse, and an output means with headphones or earphones.

First Embodiment

Figure 1:
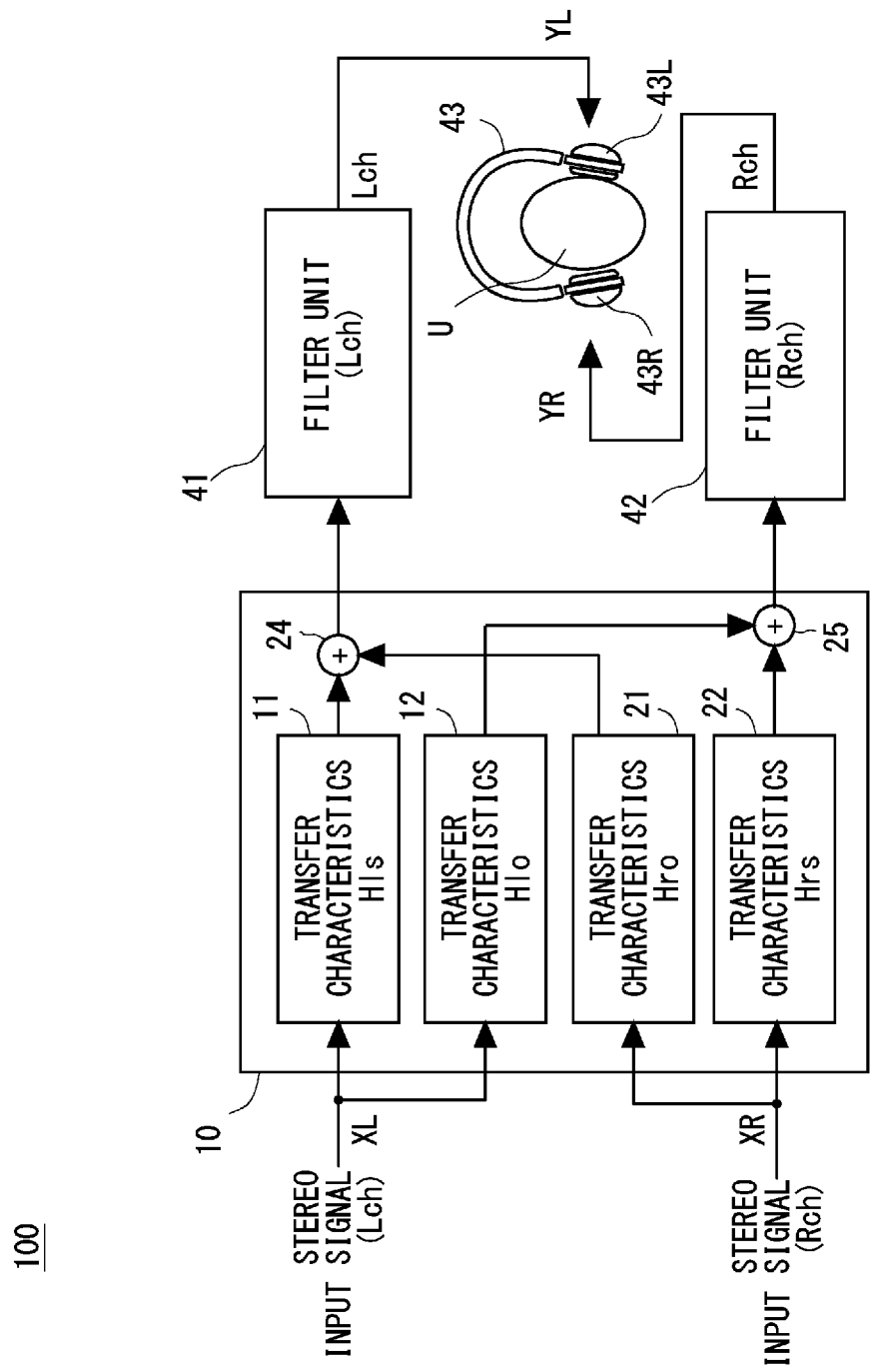
FIG. 1 is a block diagram showing an out-of-head localization device according to an embodiment.

FIG. 1 shows an out-of-head localization device 100, which is an example of a sound field reproduction device according to this embodiment. FIG. 1 is a block diagram of the out-of-head localization device. The out-of-head localization device 100 reproduces sound fields for a user U who is wearing headphones 43. Thus, the out-of-head localization device 100 performs sound localization for L-ch and R-ch stereo input signals XL and XR. The L-ch and R-ch stereo input signals XL and XR are audio reproduction signals that are output from a CD (Compact Disc) player or the like. Note that the out-of-head localization device 100 is not limited to a physically single device, and a part of processing may be performed in a different device. For example, a part of processing may be performed by a personal computer or the like, and the rest of processing may be performed by a DSP (Digital Signal Processor) included in the headphones 43 or the like.

The out-of-head localization device 100 includes an out-of-head localization unit 10, a filter unit 41, a filter unit 42, and headphones 43.

The out-of-head localization unit 10 includes convolution calculation units 11 to 12 and 21 to 22, and adders 24 and 25. The convolution calculation units 11 to 12 and 21 to 22 perform convolution processing using the spatial acoustic transfer characteristics. The stereo input signals XL and XR from a CD player or the like are input to the out-of-head localization unit 10. The spatial acoustic transfer characteristics are set to the out-of-head localization unit 10. The out-of-head localization unit 10 convolves the spatial acoustic transfer characteristics into each of the stereo input signals XL and XR having the respective channels. The spatial acoustic transfer characteristics may be a head-related transfer function (HRTF) measured in the head or auricle of the user U, or may be the head-related transfer function of a dummy head or a third person. Those transfer characteristics may be measured on sight, or may be prepared in advance.

The spatial acoustic transfer characteristics include four transfer characteristics Hls, Hlo, Hro and Hrs. The four transfer characteristics can be calculated by using a filter generation device, which is described later.

The convolution calculation unit 11 convolves the transfer characteristics Hls to the L-ch stereo input signal XL. The convolution calculation unit 11 outputs convolution calculation data to the adder 24. The convolution calculation unit 21 convolves the transfer characteristics Hro to the R-ch stereo input signal XR. The convolution calculation unit 21 outputs convolution calculation data to the adder 24. The adder 24 adds the two convolution calculation data and outputs the data to the filter unit 41.

The convolution calculation unit 12 convolves the transfer characteristics Hlo to the L-ch stereo input signal XL. The convolution calculation unit 12 outputs convolution calculation data to the adder 25. The convolution calculation unit 22 convolves the transfer characteristics Hrs to the R-ch stereo input signal XR. The convolution calculation unit 22 outputs convolution calculation data to the adder 25. The adder 25 adds the two convolution calculation data and outputs the data to the filter unit 42.

An inverse filter that cancels the ear canal transfer characteristics is set to the filter units 41 and 42. Then, the inverse filter is convolved to the reproduced signals on which processing in the out-of-head localization unit 10 has been performed. The filter unit 41 convolves the inverse filter to the L-ch signal from the adder 24. Likewise, the filter unit 42 convolves the inverse filter to the R-ch signal from the adder 25. The inverse filter cancels the characteristics from a headphone unit to microphones when the headphones 43 are worn. Specifically, when microphones are placed at the entrance of the ear canal, the transfer characteristics between the entrance of the ear canal of a user and a reproduction unit of headphones or between the eardrum and a reproduction unit of headphones are cancelled. The inverse filter may be calculated from a result of measuring the ear canal transfer function in the auricle of the user U on sight, or the inverse filter of headphone characteristics calculated from an arbitrary ear canal transfer function of a dummy head or the like may be prepared in advance.

The filter unit 41 outputs the corrected L-ch signal to a left unit 43L of the headphones 43. The filter unit 42 outputs the corrected R-ch signal to a right unit 43R of the headphones 43. The user U is wearing the headphones 43. The headphones 43 output the L-ch signal and the R-ch signal toward the user U. It is thereby possible to reproduce the sound image that is localized outside the head of the user U.

(Filter Generation Device)

Figure 2:
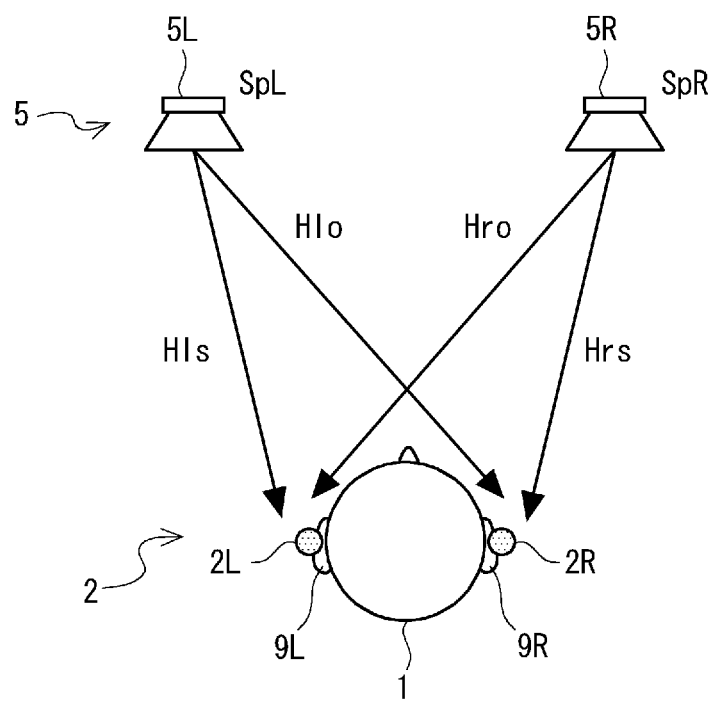
FIG. 2 is a view showing the structure of a filter generation device that generates a filter.

A filter generation device that measures spatial acoustic transfer characteristics (which are referred to hereinafter as transfer characteristics) and generates a filter is described hereinafter with reference to FIG. 2. FIG. 2 is a view schematically showing the measurement structure of a filter generation device 200. Note that the filter generation device 200 may be a common device to the out-of-head localization device 100 shown in FIG. 1. Alternatively, a part or the whole of the filter generation device 200 may be a different device from the out-of-head localization device 100. Note that, as described later, the filter generation device 200 functions also as a measurement device or a measurement unit of transfer characteristics.

As shown in FIG. 2, the filter generation device 200 includes stereo speakers 5 and stereo microphones 2. The stereo speakers 5 are placed in a measurement environment. The measurement environment is an environment where acoustic characteristics are not taken into consideration (for example, the shape of a room is asymmetric etc.) or an environment where environmental sounds, which are noise, are heard. To be more specific, the measurement environment may be the user U's room at home, a dealer or showroom of an audio system or the like. Further, there is a case where the measurement environment has a layout where acoustic characteristics are not taken into consideration. In a room at home, there is a case where furniture and the like are arranged asymmetrically. There is also a case where speakers are not arranged symmetrically with respect to a room. Further, there is a case where unwanted echoes occur due to reflection off a window, wall surface, floor surface and ceiling surface. In this embodiment, processing for measuring appropriate transfer characteristics even under the measurement environment which is not ideal is performed.

In this embodiment, a processor (not shown in FIG. 2) of the filter generation device 200 performs processing for measuring appropriate transfer characteristics. The processor is a personal computer (PC), a tablet terminal, a smart phone or the like, for example.

The stereo speakers 5 include a left speaker 5L and a right speaker 5R. For example, the left speaker 5L and the right speaker 5R are placed in front of a listener 1. The left speaker 5L and the right speaker 5R output impulse sounds for impulse response measurement and the like.

The stereo microphones 2 include a left microphone 2L and a right microphone 2R. The left microphone 2L is placed on a left ear 9L of the listener 1, and the right microphone 2R is placed on a right ear 9R of the listener 1. To be specific, the microphones 2L and 2R are preferably placed at the entrance of the ear canal or at the eardrum of the left ear 9L and the right ear 9R, respectively. The microphones 2L and 2R pick up measurement signals output from the stereo speakers 5 and acquire sound pickup signals. The microphones 2L and 2R output the sound pickup signals to the filter generation device 200, which is described later. The listener 1 may be a person or a dummy head. In other words, in this embodiment, the listener 1 is a concept that includes not only a person but also a dummy head.

As a result that the impulse sounds that are output from the left and right speakers 5L and 5R are respectively measured by the microphones 2L and 2R as described above, impulse responses are measured. The filter generation device 200 stores the sound pickup signals acquired based on the impulse response measurement into a memory or the like. The transfer characteristics Hls between the left speaker 5L and the left microphone 2L, the transfer characteristics Hlo between the left speaker 5L and the right microphone 2R, the transfer characteristics Hro between the right speaker 5R and the left microphone 2L, and the transfer characteristics Hrs between the right speaker 5R and the right microphone 2R are thereby measured. Specifically, the left microphone 2L picks up the measurement signal that is output from the left speaker 5L, and thereby the transfer characteristics Hls are acquired. The right microphone 2R picks up the measurement signal that is output from the left speaker 5L, and thereby the transfer characteristics Hlo are acquired. The left microphone 2L picks up the measurement signal that is output from the right speaker 5R, and thereby the transfer characteristics Hro are acquired. The right microphone 2R picks up the measurement signal that is output from the right speaker 5R, and thereby the transfer characteristics Hrs are acquired.

Then, the filter generation device 200 generates filters in accordance with the transfer characteristics Hls to Hrs from the left and right speakers 5L and 5R to the left and right microphones 2L and 2R based on the sound pickup signals. To be specific, the filter generation device 200 cuts out the transfer characteristics Hls to Hrs with a specified filter length and generates them as filters to be used for the convolution calculation of the out-of-head localization unit 10. As shown in FIG. 1, the out-of-head localization device 100 performs out-of-head localization by using the transfer characteristics Hls to Hrs between the left and right speakers 5L and 5R and the left and right microphones 2L and 2R. Specifically, the out-of-head localization is performed by convolving the transfer characteristics to the audio reproduced signals.

A problem that arises when measuring the transfer characteristics under various measurement environments is described hereinafter. First, the signal waveforms of sound pickup signals when carrying out impulse response measurement in an ideal measurement environment are shown as a measurement example 1 in FIGS. 3 and 4. Note that, in the signal waveforms in FIGS. 3 and 4 and the figures described below, the horizontal axis indicates the sample number, and the vertical axis indicates the amplitude. Note that the sample number corresponds to the time from the start of measurement, and the measurement start timing is 0. The amplitude corresponds to the signal strength of the sound pickup signals acquired by the microphones 2L and 2R, or the sound pressure, which has a positive or negative sign.

In the measurement example 1, a rigid sphere as a model for a human head without an auricle is placed in an anechoic room with no echo, and measurement is carried out. In the anechoic room as the measurement environment, the left and right speakers 5L and 5R are arranged symmetrically in front of the rigid sphere. Further, the microphones are placed symmetrically at positions corresponding to human head ears with respect to the rigid sphere.

Figure 3:
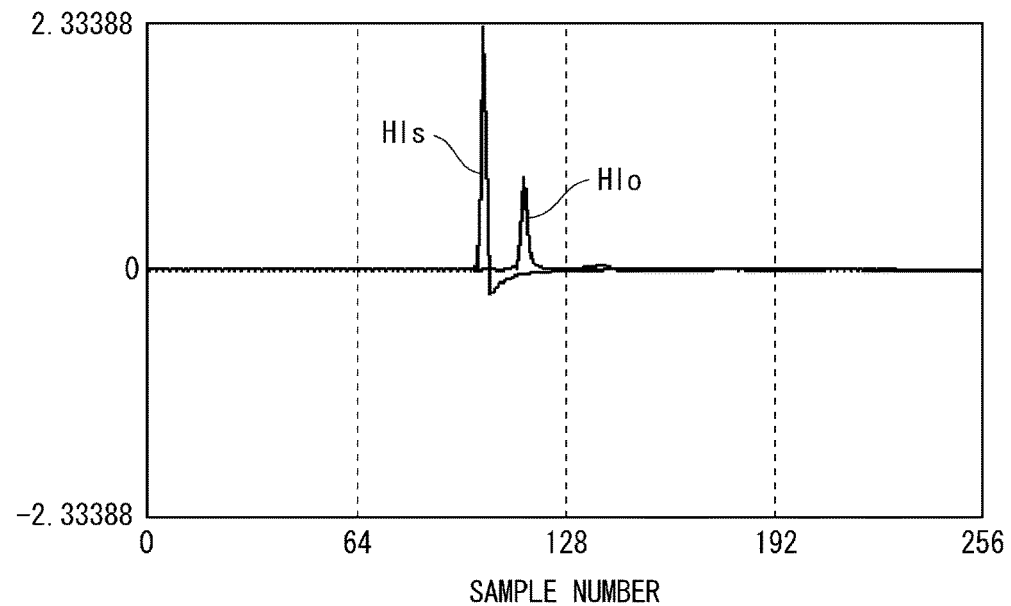
FIG. 3 is a view showing transfer characteristics Hls and Hlo in a measurement example 1.
Figure 4:
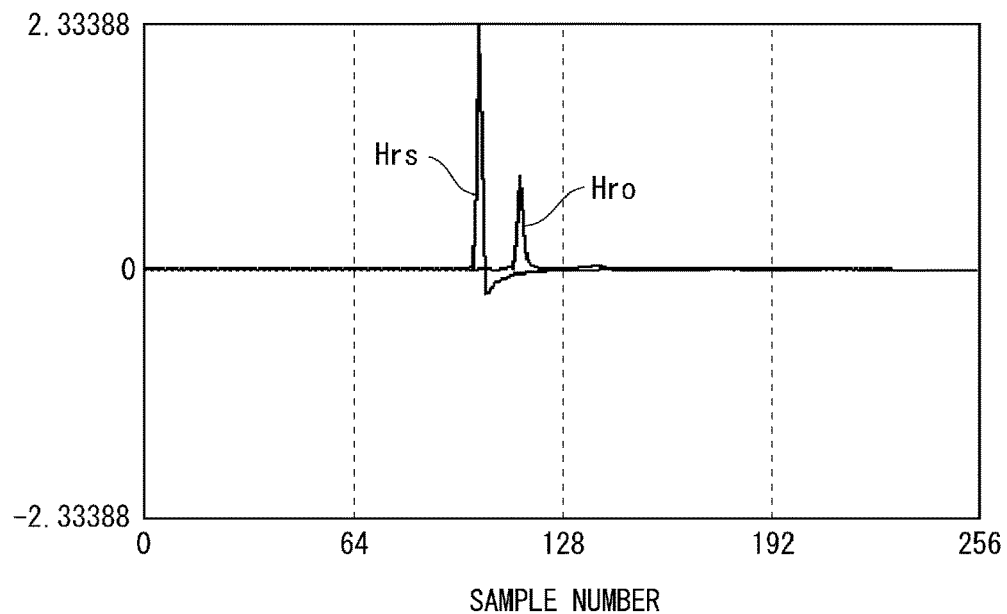
FIG. 4 is a view showing transfer characteristics Hrs and Hro in the measurement example 1.

In the case of carrying out impulse measurement in such an ideal measurement environment, the transfer characteristics Hls, Hlo, Hro and Hrs as shown in FIGS. 3 and 4 are measured. FIG. 3 shows measurement results of the transfer characteristics Hls and Hlo in the measurement example 1, which is when driving the left speaker 5L. FIG. 4 shows measurement results of the transfer characteristics Hro and Hrs in the measurement example 1, which is when driving the right speaker 5R. The transfer characteristics Hls in FIG. 3 and the transfer characteristics Hrs in FIG. 4 have substantially the same waveform. Specifically, peaks with substantially the same amplitude appear at substantially the same timing in the transfer characteristics Hls and the transfer characteristics Hrs. Specifically, the arrival time of an impulse sound from the left speaker 5L to the left microphone 2L and the arrival time of an impulse sound from the right speaker 5R to the right microphone 2R coincide with each other.

Figure 5:
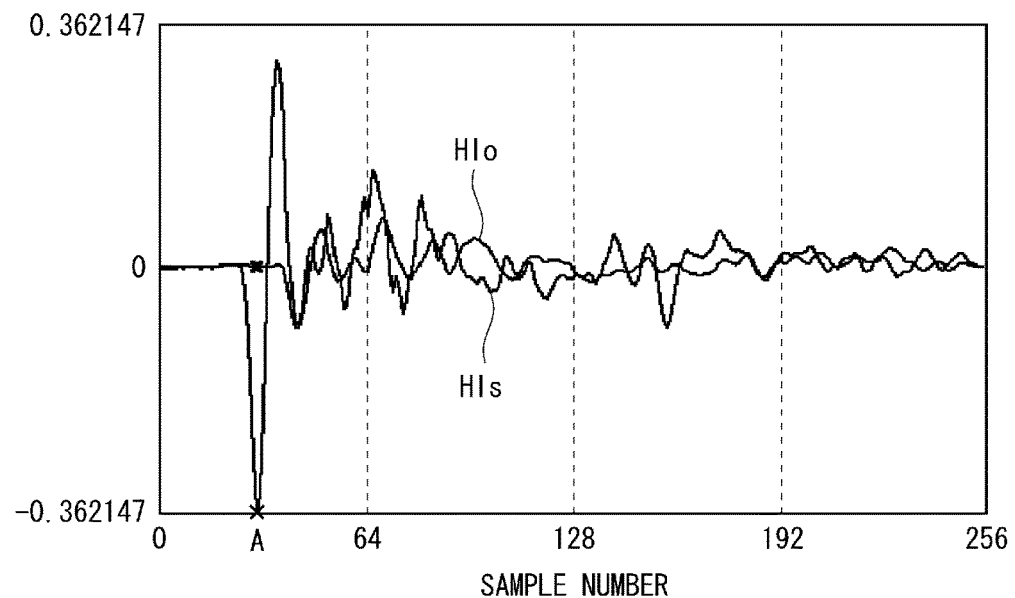
FIG. 5 is a view showing transfer characteristics Hls and Hlo in a measurement example 2.
Figure 6:
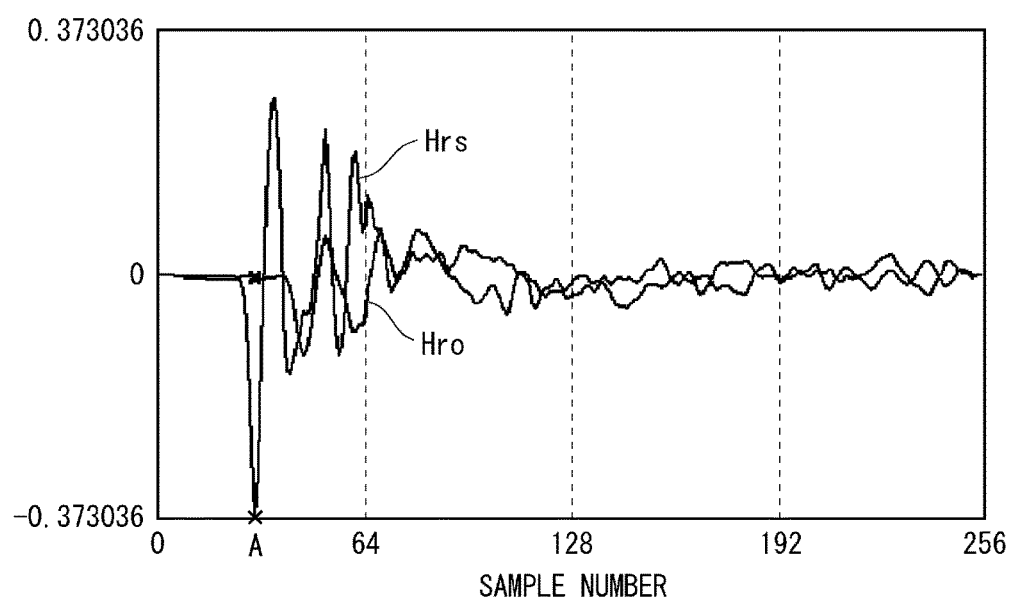
FIG. 6 is a view showing transfer characteristics Hrs and Hro in the measurement example 2.
Figure 7:
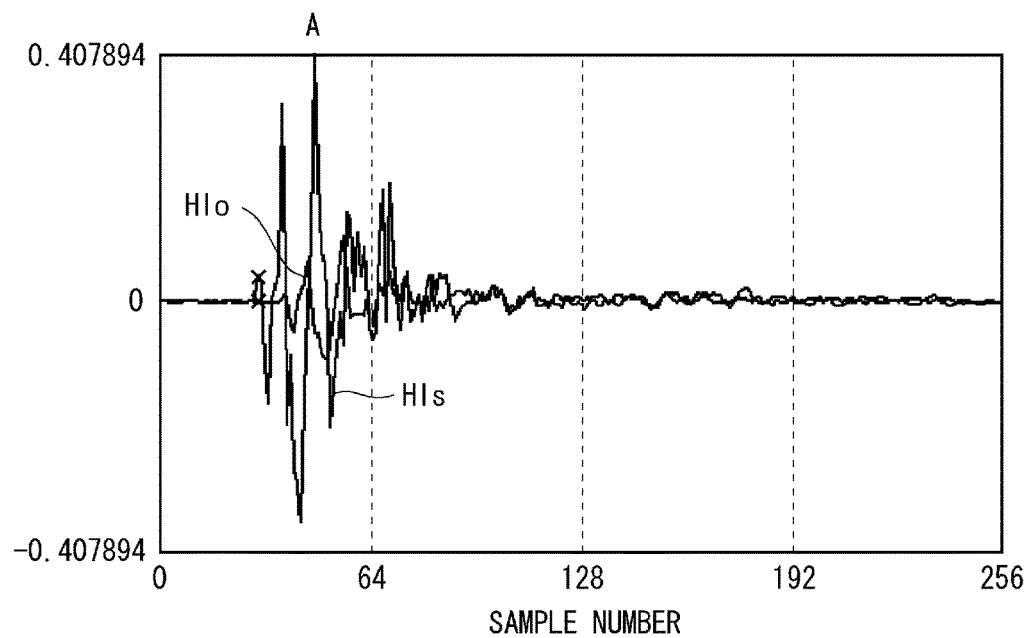
FIG. 7 is a view showing transfer characteristics Hls and Hlo in a measurement example 3.
Figure 8:
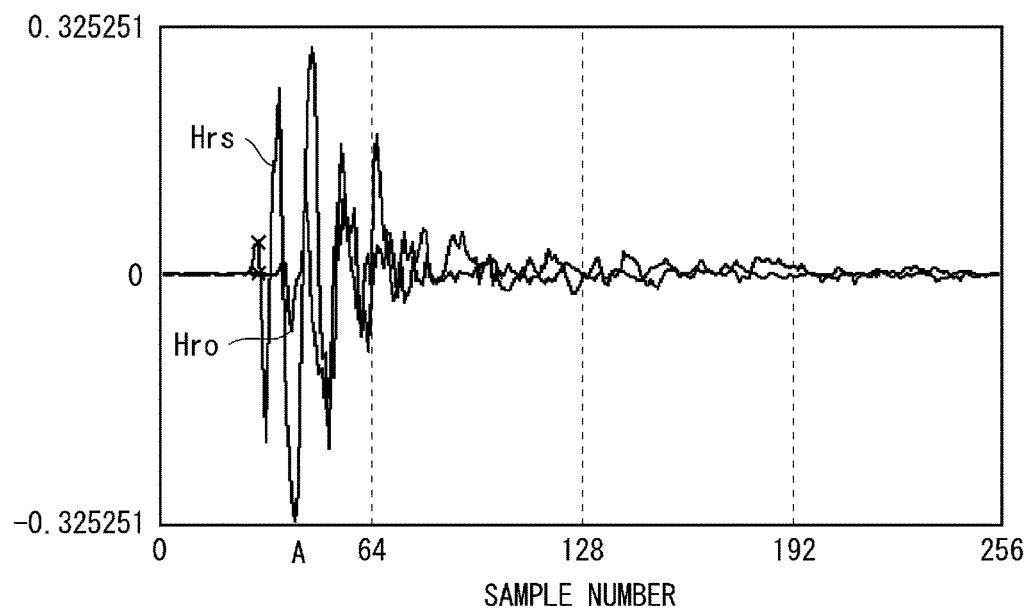
FIG. 8 is a view showing transfer characteristics Hrs and Hro in the measurement example 3.

The transfer characteristics measured in the measurement environment where actual measurement is carried out are shown as measurement examples 2 and 3 in FIGS. 5 to 8. FIG. 5 shows the transfer characteristics Hls and Hlo in the measurement example 2, and FIG. 6 shows the transfer characteristics Hro and Hrs in the measurement example 2. FIG. 7 shows the transfer characteristics Hls and Hlo in the measurement example 3, and FIG. 8 shows the transfer characteristics Hro and Hrs in the measurement example 3. The measurement examples 2 and 3 are measurements carried out in different measurement environments, which is carried out in the measurement environments with echoes from an object near a listener, a wall surface, a ceiling and a floor.

When the actual measurement environment is at the home of the listener 1 or the like, impulse sounds are output from the stereo speakers 5 by a personal computer, a smart phone or the like. In other words, a general-purpose information processor such as a personal computer or a smart phone is used as an acoustic device. In such a case, there is a possibility that the amount of delay in the acoustic device might vary from measurement to measurement. For example, a signal delay can occur due to processing in a processor of the acoustic device or processing in an interface.

Thus, even when a rigid sphere is placed at the center of the stereo speakers 5, a response position (peak position) differs between when driving the left speaker 5L and when driving the right speaker 5R due to a delay in the acoustic device. In such a case, the transfer characteristics are cut out so that the maximum amplitude (the amplitude where the absolute value reaches its maximum) is at the same time as shown in the measurement examples 2 and 3. For example, in the measurement example 2, the transfer characteristics Hls, Hlo, Hro and Hrs are cut out so that the maximum amplitude A of the transfer characteristics Hls and Hrs appears at the 30th sample. Note that, in the measurement example 2, the maximum amplitude is a negative peak (A in FIGS. 5 and 6).

However, there is a case where the left and right auricle shapes of the listener 1 are different. In this case, even when the listener 1 is located in a symmetrical position with respect to the left and right speakers 5L and 5R, the left and right transfer characteristics are largely different. Further, the left and right transfer characteristics are largely different also when the measurement environment is asymmetric.

Figure 9:
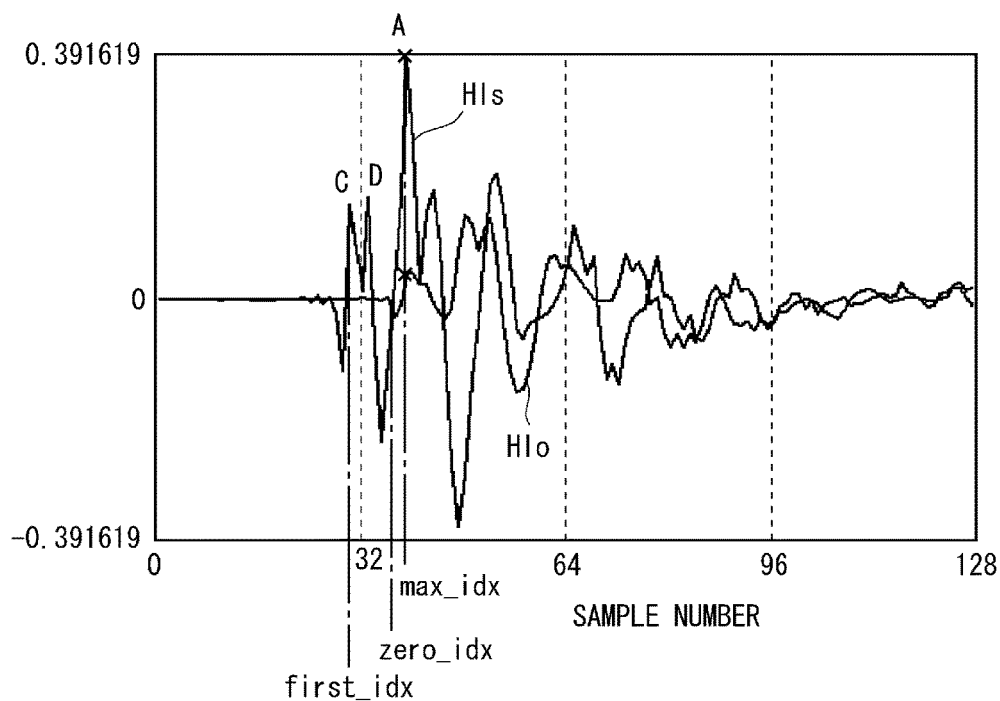
FIG. 9 is a view showing transfer characteristics Hls and Hlo in a measurement example 4.
Figure 10:
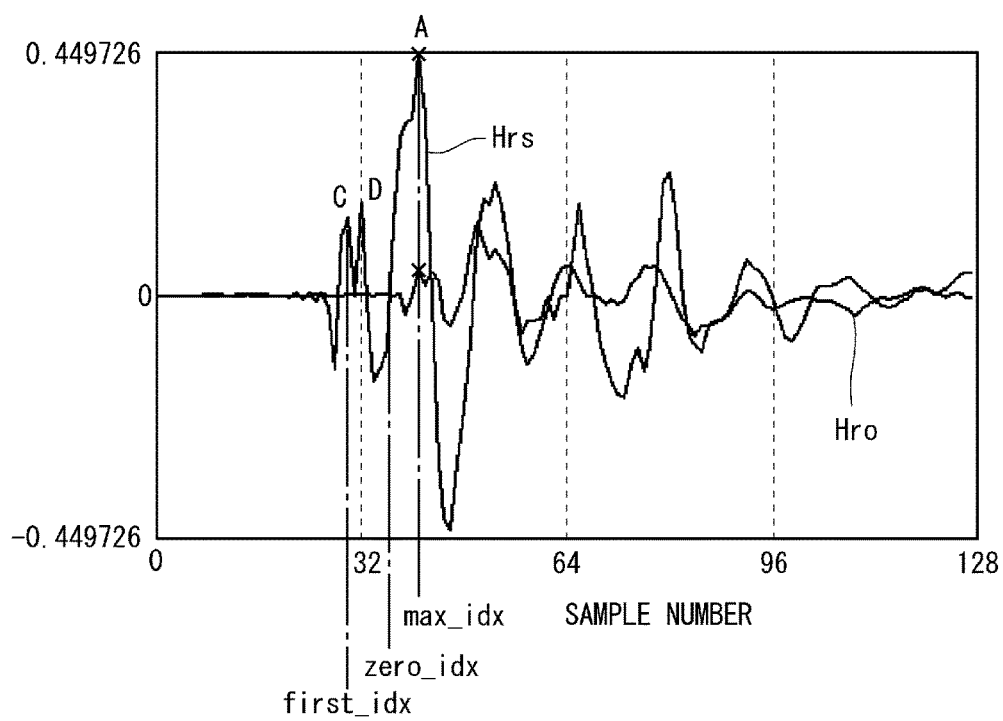
FIG. 10 is a view showing transfer characteristics Hrs and Hro in the measurement example 4.

Further, when carrying out measurement in the actual measurement environment, there is a case where the peak with the maximum amplitude is split into two peaks as in the measurement example 4 shown in FIGS. 9 and 10. In the measurement example 4, the maximum amplitude A of the transfer characteristics Hrs is split into two peaks as shown in FIG. 10.

Figure 11:
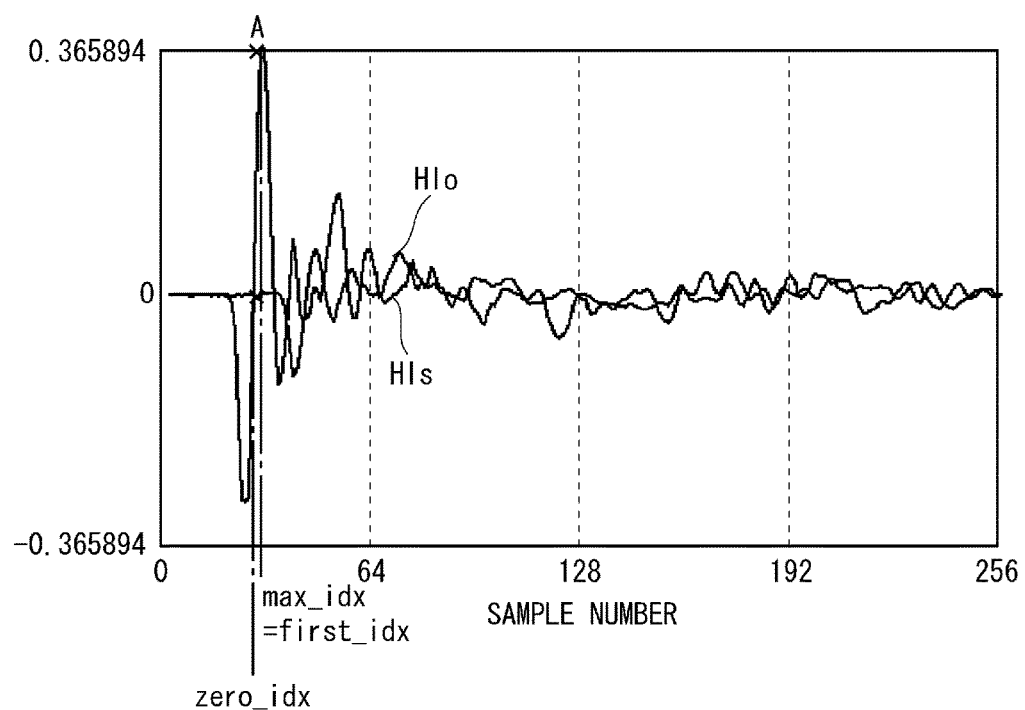
FIG. 11 is a view showing transfer characteristics Hls and Hlo in a measurement example 5.
Figure 12:
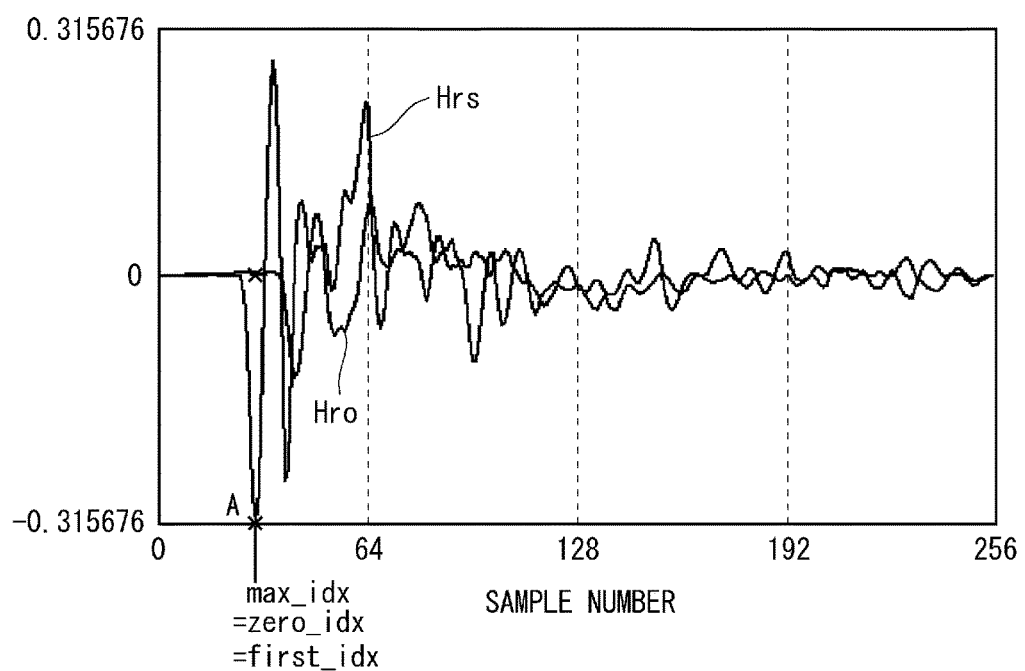
FIG. 12 is a view showing transfer characteristics Hrs and Hro in the measurement example 5.

Further, there is a case where the sign of the peak with the maximum amplitude differs between the left and right transfer characteristics Hls and Hrs as in the measurement example 5 shown in FIGS. 11 and 12. In the measurement example 5, the maximum amplitude A of the transfer characteristics Hls has a positive peak (FIG. 11), and the maximum amplitude A of the transfer characteristics Hrs has a negative peak (FIG. 12).

Figure 13:
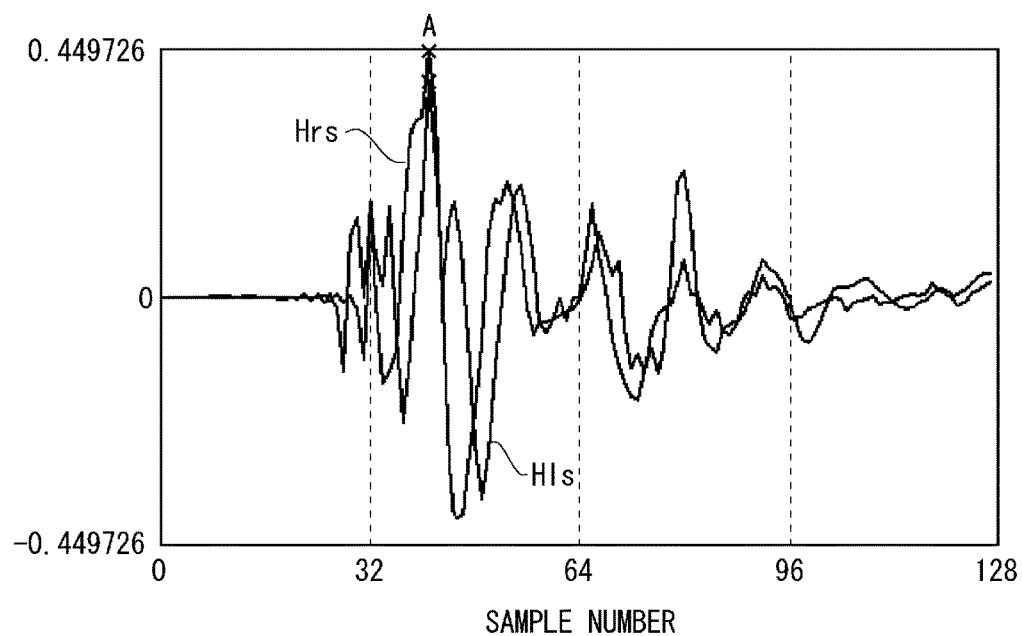
FIG. 13 is a view showing cut out transfer characteristics Hls and Hrs in the measurement example 4.
Figure 14:
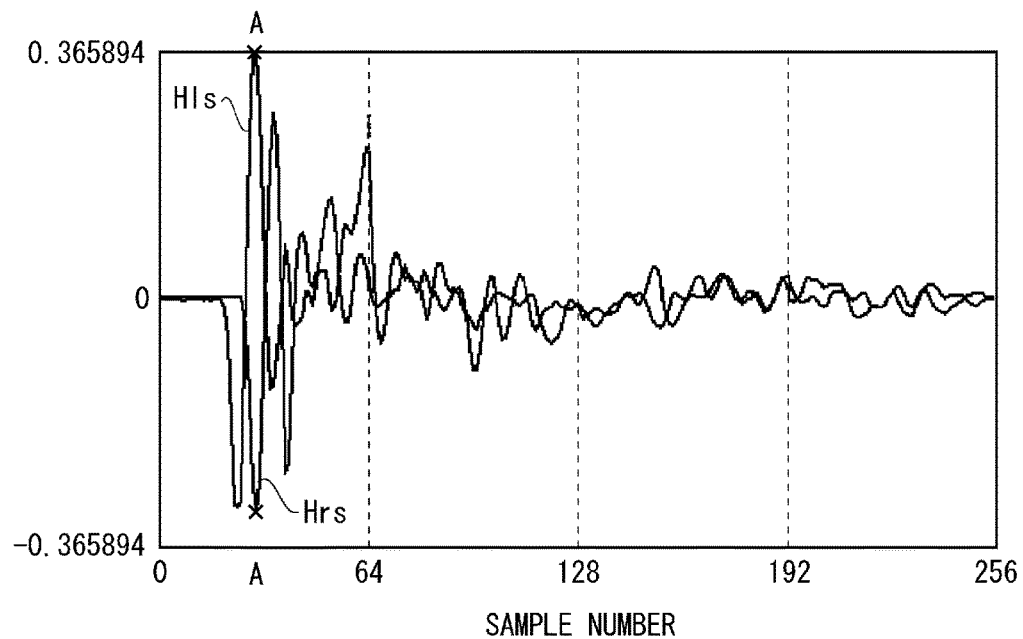
FIG. 14 is a view showing cut out transfer characteristics Hls and Hrs in the measurement example 5.

When the signal waveforms of the left and right transfer characteristics Hls and Hrs are largely different, the arrival times of sounds from the left and right stereo speakers 5 do not coincide with each other. Accordingly, when the out-of-head localization unit 10 performs the convolution calculation, sound fields with a good balance between left and right cannot be obtained in some cases. For example, FIGS. 13 and 14 show the transfer characteristics equally cut out at the sample position (or time) where the transfer characteristics Hls and Hrs have the maximum amplitude in the measurement example 4 and the measurement example 5. FIG. 13 shows the transfer characteristics Hls and Hrs in the measurement example 4, and FIG. 14 shows the transfer characteristics Hls and Hrs in the measurement example 5.

When the waveforms of the left and right transfer characteristics Hls and Hrs are largely different as shown in FIGS. 13 and 14, there is a possibility that sound fields with a good balance between left and right cannot be obtained. For example, a vocal sound image to be localized at the center is deviated to left or right. In this manner, there is a case where the transfer characteristics obtained by different impulse response measurements cannot be cut out appropriately. In other words, there is a case where a filter cannot be generated appropriately. In this embodiment, the filter generation device 200 performs the following processing and thereby achieves appropriate cutout.

Figure 15:
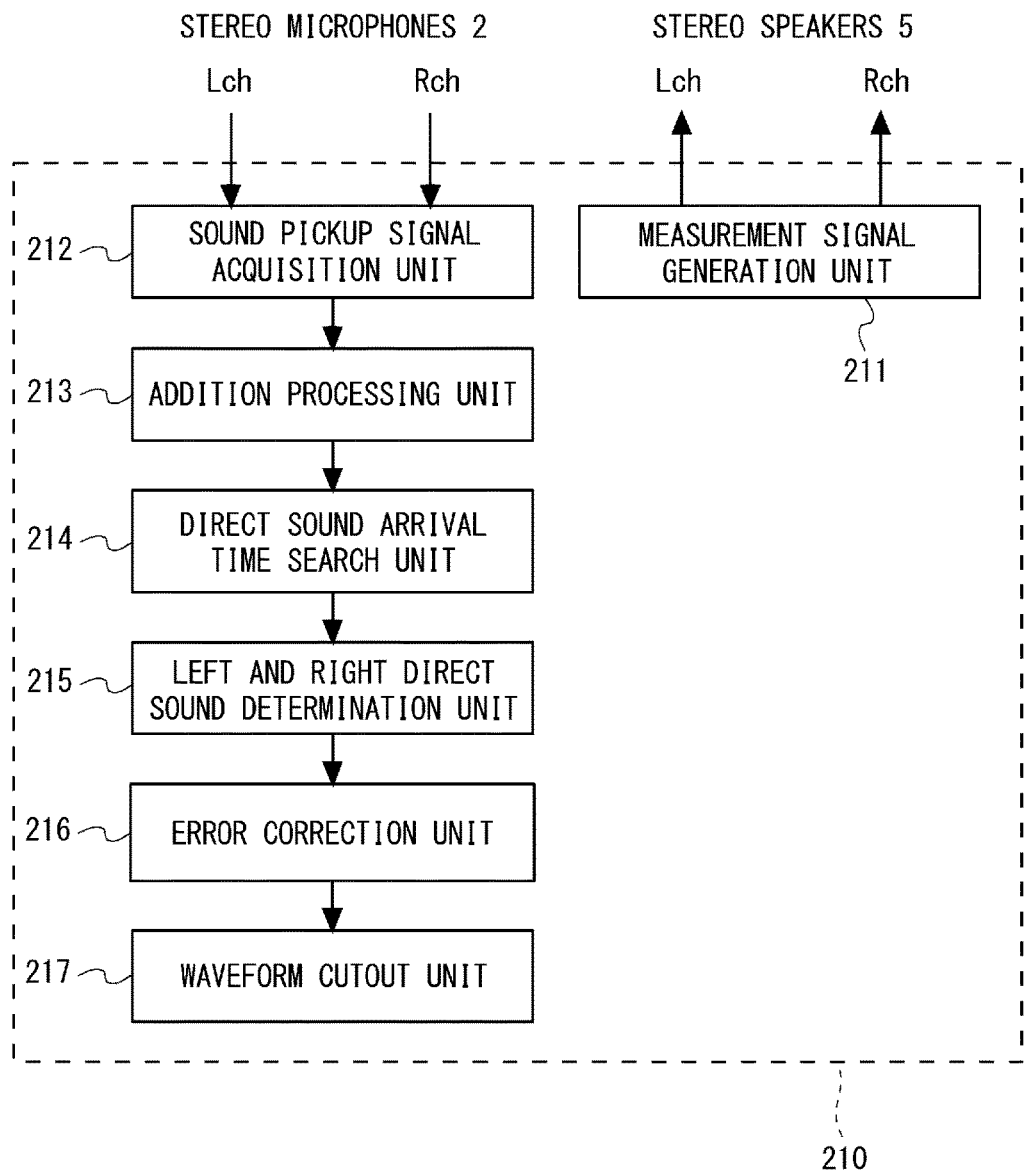
FIG. 15 is a control block diagram showing the structure of a filter generation device.

The structure of a processor 210 of the filter generation device 200 is described hereinafter with reference to FIG. 15. FIG. 15 is a block diagram showing the structure of the processor 210. The processor 210 includes a measurement signal generation unit 211, a sound pickup signal acquisition unit 212, an addition processing unit 213, a direct sound arrival time search unit 214, a left and right direct sound determination unit 215, an error correction unit 216, and a waveform cutout unit 217. For example, the processor 210 is an information processor such as a personal computer, a smart phone, a tablet terminal or the like, and it includes an audio input interface (IF) and an audio output interface. Thus, the processor 210 is an acoustic device having input/output terminals connected to the stereo microphones 2 and the stereo speakers 5.

The measurement signal generation unit 211 includes a D/A converter, an amplifier and the like, and it generates a measurement signal. The measurement signal generation unit 211 outputs the generated measurement signal to each of the stereo speakers 5. Each of the left speaker 5L and the right speaker 5R outputs a measurement signal for measuring the transfer characteristics. The impulse response measurement by the left speaker 5L and the impulse response measurement by the right speaker 5R are carried out.

Each of the left microphone 2L and the right microphone 2R of the stereo microphones 2 picks up the measurement signal, and outputs the sound pickup signal to the processor 210. The sound pickup signal acquisition unit 212 acquires the sound pickup signals from the left microphone 2L and the right microphone 2R. Note that the sound pickup signal acquisition unit 212 includes an A/D converter, an amplifier and the like, and it may perform A/D conversion, amplification and the like of the sound pickup signals from the left microphone 2L and the right microphone 2R. The sound pickup signal acquisition unit 212 outputs the acquired sound pickup signals to the addition processing unit 213.

By driving of the left speaker 5L, a first sound pickup signal in accordance with the transfer characteristics Hls between the left speaker 5L and the left microphone 2L and a second sound pickup signal in accordance with the transfer characteristics Hlo between the left speaker 5L and the right microphone 2R are acquired at the same time. Further, by driving of the right speaker 5R, a third sound pickup signal in accordance with the transfer characteristics Hro between the right speaker 5R and the left microphone 2L and a fourth sound pickup signal in accordance with the transfer characteristics Hrs between the right speaker 5R and the right microphone 2R are acquired at the same time.

The addition processing unit 213 performs addition processing on each of the first to fourth sound pickup signals. The addition processing is processing that cuts out and adds the sound pickup signals acquired by a plurality of impulse response measurements. By performing the addition processing, it is possible to reduce the effect of unexpected noise. For example, the number of additions may be 30. The addition processing unit 213 separates and adds the sound pickup signals and thereby acquires the transfer characteristics Hls, Hlo, Hro and Hrs.

To be specific, the left and right microphones 2L and 2R pick up a measurement signal when impulse sounds are output a plurality of times in a row from the left speaker 5L. The addition processing unit 213 cuts out the sound pickup signal picked up by the microphone 2L, adds them, and divides this sum by the number of additions. The transfer characteristics Hls are thereby obtained. Further, the addition processing unit 213 cuts out the sound pickup signal picked up by the microphone 2R, adds them, and divides this sum by the number of additions. The transfer characteristics Hlo are thereby obtained.

Likewise, the left and right microphones 2L and 2R pick up a measurement signal when impulse sounds are output a plurality of times in a row from the right speaker 5R. The addition processing unit 213 cuts out the sound pickup signal picked up by the microphone 2L, adds them, and divides this sum by the number of additions. The transfer characteristics Hro are thereby obtained. Further, the addition processing unit 213 cuts out the sound pickup signal picked up by the microphone 2R, adds them, and divides this sum by the number of additions. The transfer characteristics Hrs are thereby obtained.

The measurement signal that is output from the speakers 5L and 5R contains a plurality of signal sounds in a row with a time interval. The signal sounds are impulse sounds, for example. To be specific, when a measurement start input from the listener 1 is received, the left speaker 5L outputs a measurement signal containing 30 impulse sounds. The microphones 2L and 2R pick up the measurement signal without interruption. In other words, the microphones 2L and 2R continuously pick up the measurement signal containing 30 impulse sounds. The measurement signal is not limited to an impulse sound, and it may be another signal such as TSP (Time Stretched Pulse) sound.

Likewise, when a measurement start input from the listener 1 is received, the right speaker 5R outputs a measurement signal containing 30 impulse sounds. The microphones 2L and 2R pick up the measurement signal without interruption. In other words, the microphones 2L and 2R continuously pick up the measurement signal containing 30 impulse sounds.

The microphones 2L and 2R acquire the sound pickup signal containing 30 impulse responses and output it to the sound pickup signal acquisition unit 212. The sound pickup signal acquisition unit 212 performs A/D conversion or the like on the sound pickup signal and outputs it to the addition processing unit 213. Thus, the sound pickup signal that is input to the addition processing unit 213 contains 30 impulse sounds. Specifically, in the sound pickup signal, 30 impulse sounds occur in a row with a time interval.

Note that the number of impulse sounds contained in the measurement signal is not limited to 30, and it may be any number not less than 2. Addition and division can be performed in accordance with the number of impulse sounds contained in the measurement signal. Further, signal sounds contained in the measurement signal are not limited to impulse sounds. The time interval of impulse sounds in the measurement signal can be set in accordance with a measurement environment. Specifically, the time interval with which echoes or the like fall below a certain level before the next impulse sound is output can be set in advance.

In this embodiment, the measurement signal generation unit 211 generates a measurement signal containing a plurality of impulse sounds. Then, the speakers 5 output the measurement signal containing 30 impulse sounds without interruption. In other words, after the start of measurement, 30 impulse sounds are output in a row with a time interval. Then, the sound pickup signal acquisition unit 212 outputs the sound pickup signal containing 30 impulse responses to the addition processing unit 213. Then, the addition processing unit 213 cuts out the sound pickup signal and generates 30 cutout signals. The addition processing unit 213 cuts some of the samples out of the sound pickup signal to generate cutout signals. Each cutout signal contains one impulse response. The addition processing unit 213 adds the cutout signals with their peak positions aligned, and then divides this sum by the number of additions (30). In this manner, addition processing which corresponds to synchronous addition is performed, thereby increasing the S/N ratio of the sound pickup signal. It is thereby possible to reduce the effect of unexpected noise.

Figure 16:
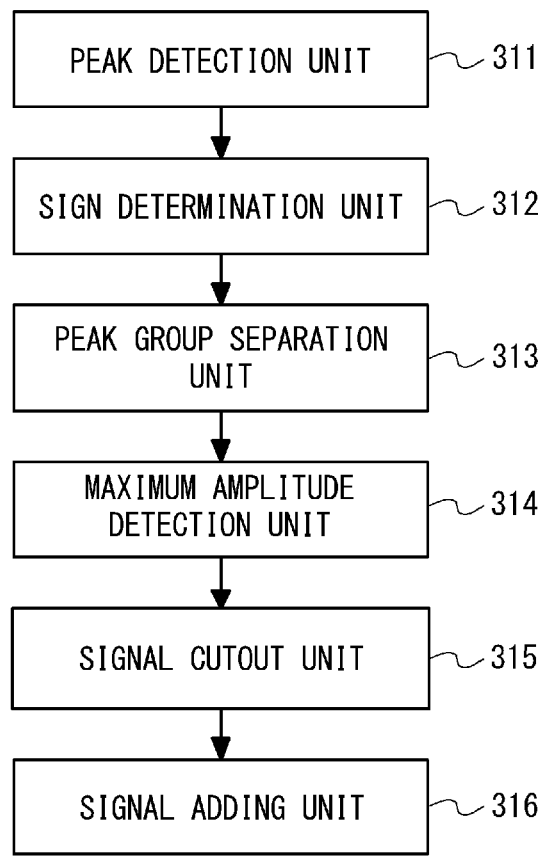
FIG. 16 is a block diagram showing the structure of an addition processing unit.

The addition processing, which is one feature of this embodiment, is described hereinafter. First, the structure of the addition processing unit 213 is described with reference to FIG. 16. FIG. 16 is a block diagram showing the structure of the addition processing unit 213. The addition processing unit 213 includes a peak detection unit 311, a sign determination unit 312, a peak group separation unit 313, a maximum amplitude detection unit 314, a signal cutout unit 315, and a signal adding unit 316.

The peak detection unit 311 detects positive and negative peaks included in a sound pickup signal. In other words, the peak detection unit 311 detects a positive peak and a negative peak. To be specific, the peak detection unit 311 extracts the amplitude value and the time of all peaks from the sound pickup signal. The time of a peak is indicated by a sample number i. Specifically, the time can be indicated by a sample number i (i is an integer of 0 and more), where the sound pickup start time of the microphones 2 is i=0.

The sign determination unit 312 determines a positive or negative sign based on the amplitude of a peak included in a sound pickup signal. To be specific, the sign determination unit 312 calculates the maximum amplitude of an extracted positive peak and the maximum amplitude of an extracted negative peak. Stated differently, the sign determination unit 312 determines whether the maximum value of the absolute value of the amplitude of the sound pickup signal is a positive peak or a negative peak. The sign determination unit 312 compares the maximum amplitude of a positive peak and the absolute value of the maximum amplitude of a negative peak and selects the sign of the larger one.

When the maximum amplitude of a positive peak is larger than the absolute value of the maximum amplitude of a negative peak, the sign determination unit 312 determines that a sign to be focused on is positive. On the other hand, when the maximum amplitude of a positive peak is smaller than the absolute value of the maximum amplitude of a negative peak, the sign determination unit 312 determines that a sign to be focused on is negative. The sign determination unit 312 may determine a sign by a method other than comparison of the maximum amplitude. For example, a sign to be focused on may be determined based on the number of peaks with a specified amplitude value or larger, the average value of a plurality of peaks or the like.

Then, the peak group separation unit 313 separates a peak sequence composed of peaks with the determined sign into a plurality of peak groups. To be specific, the peak group separation unit 313 extracts peaks with the sign to be focused on and obtains a peak sequence. In the peak sequence, the peak time and the absolute value of the amplitude of the peak are correlated. Further, the peak group separation unit 313 eliminates, from the peak sequence, peaks having an amplitude with an absolute value smaller than a threshold, and thereby generates a peak sequence Thdata.

After that, the peak group separation unit 313 obtains the first peak in a peak group from the peaks having an amplitude with an absolute value equal to or larger than a threshold. The peak group separation unit 313 sets, as the first peak, the peak at the earliest time, which is, the peak with the smallest index i, in the peak sequence Thdata. The peak group separation unit 313 then sets the peaks included in a specified period of time from the first peak as one peak group. The first peak group can be thereby obtained.

Likewise, the peak group separation unit 313 sets, as the first peak, the peak at the earliest time, which is, the peak with the smallest index i, after the first peak group. The peak group separation unit 313 then sets the peaks included in a specified period of time from the first peak as one peak group. The first peak group and the second peak group can be thereby obtained. The peak group separation unit 313 repeats this processing and thereby obtains 30 peak groups.

The maximum amplitude detection unit 314 detects the maximum amplitude in each of a plurality of peak groups. In other words, the maximum amplitude detection unit 314 detects the maximum amplitude in each peak group. Note that, when a sign to be focused on is negative, the maximum amplitude corresponds to a peak having an amplitude with the largest absolute value.

The signal cutout unit 315 cuts out a sound pickup signal based on the cutout timing based on the maximum amplitude and thereby generates a plurality of cutout signals. In this example, 30 cutout signals are generated. Note that each of a plurality of cutout signals is composed of the same number of samples. For example, a cutout signal is a signal containing a specified number of samples, starting from one which is 100 samples before a sample number having the maximum amplitude.

The signal adding unit 316 adds the cutout signals cut out by the signal cutout unit 315 and divides this sum by the number of additions. The signal adding unit 316 adds the cutout signals with the maximum amplitude of each cutout signal matching one another. In other words, the cutout signals are added with the timing of the cutout signals aligned. 30 times of impulse response measurement can be thereby averaged accurately. This prevents a positive peak and a negative peak from canceling each other out, for example. It is thereby possible to appropriately measure transfer characteristics.

Note that the above-described addition processing may be performed for each of the transfer characteristics Hlo, Hls, Hro and Hrs. Alternatively, the cutout timing in the signal addition of the transfer characteristics Hls may be set at the cutout timing obtained in the signal addition of the transfer characteristics Hlo. Likewise, the cutout timing in the signal addition of the transfer characteristics Hro may be set at the cutout timing obtained in the signal addition of the transfer characteristics Hrs.

Figure 17:
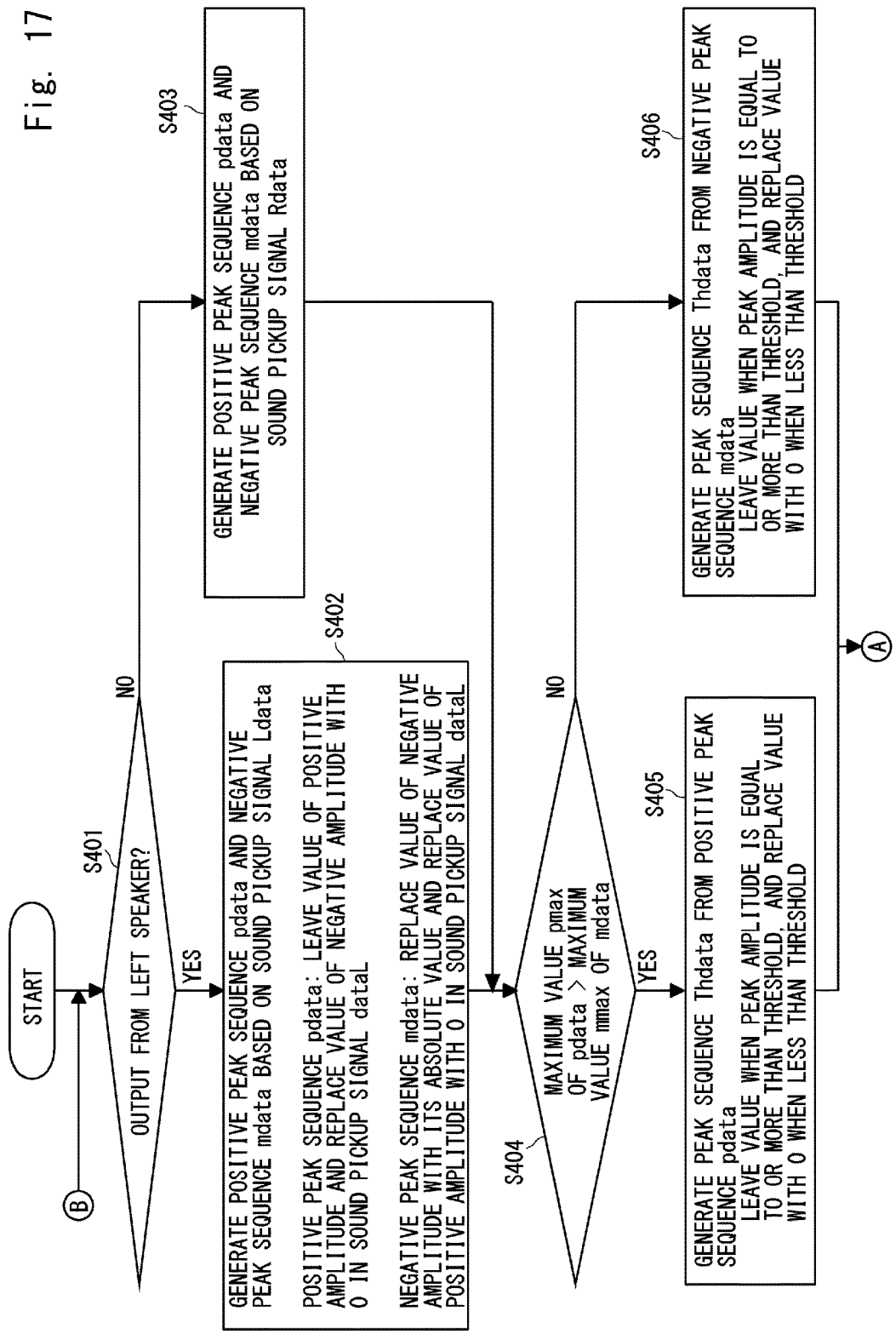
FIG. 17 is a flowchart showing addition processing in the addition processing unit.
Figure 18:
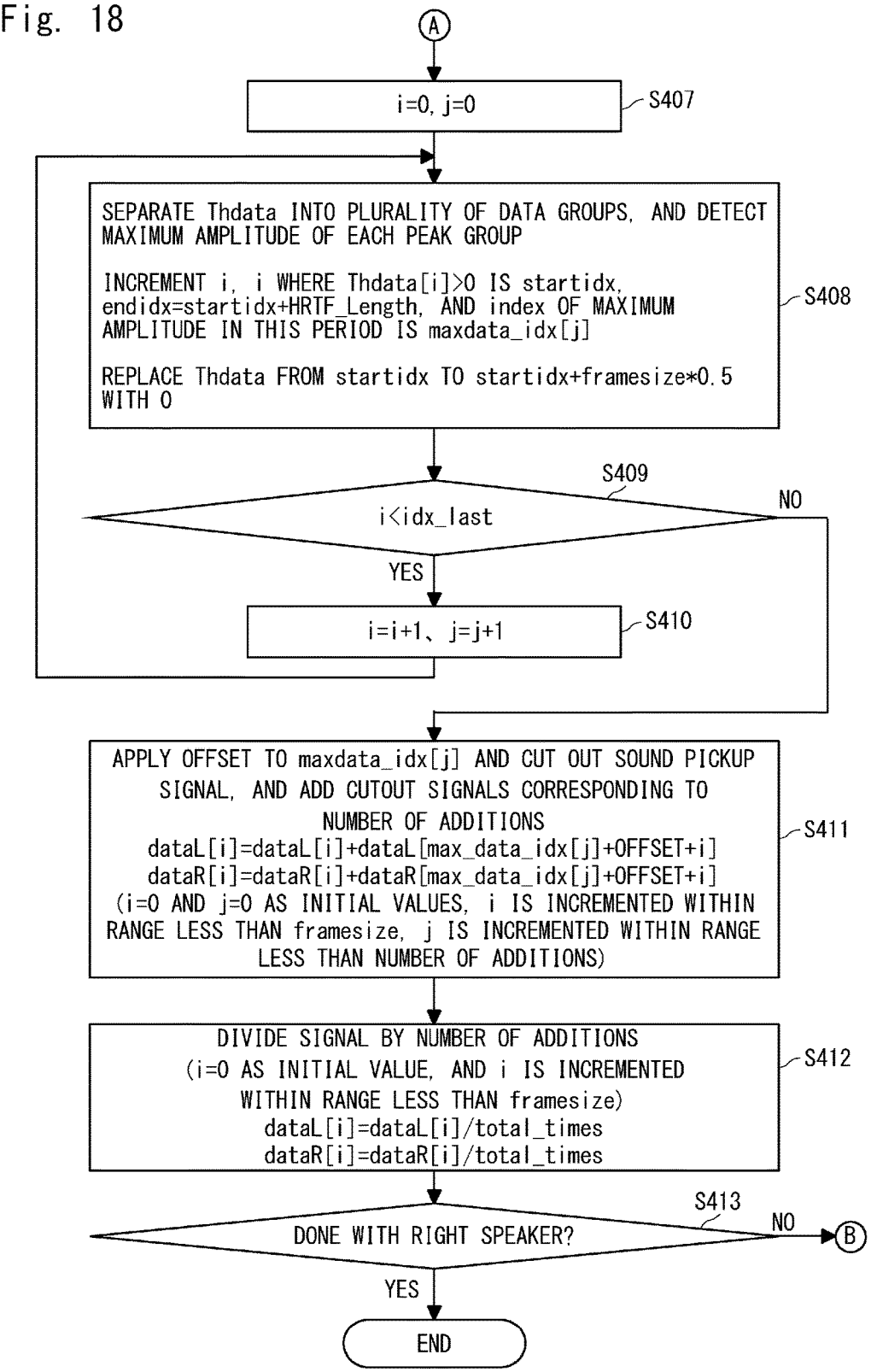
FIG. 18 is a flowchart showing addition processing in the addition processing unit.

The addition processing in the addition processing unit 213 is described hereinafter in detail with reference to FIGS. 17 to 24. FIGS. 17 and 18 are flowcharts showing the addition processing in the addition processing unit 213. FIGS. 19 to 24 are signal waveform diagrams illustrating the addition processing. In FIGS. 19 to 24, the horizontal axis indicates a sample number (index), and the vertical axis indicates an amplitude (amp). FIGS. 19 to 24 show the response signal waveforms of first to third impulse sounds or their peak sequences.

First, the peak detection unit 311 determines whether a measurement signal is output from the left speaker 5L (S401). When the measurement signal is output from the left speaker 5L (Yes in S401), the peak detection unit 311 generates a positive peak sequence pdata and a negative peak sequence mdata based on a sound pickup signal dataL (S402). Note that the positive peak sequence pdata is a sequence composed only of peaks having a positive amplitude. The negative peak sequence mdata is a sequence composed only of peaks having a negative amplitude.

Figure 19:
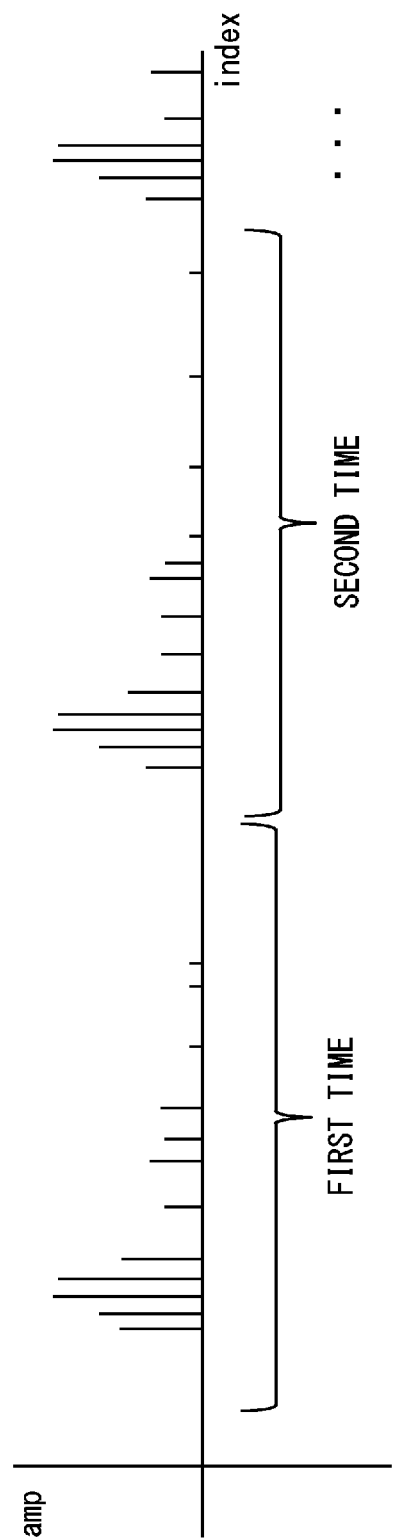
FIG. 19 is a signal waveform diagram illustrating addition processing in the addition processing unit.
Figure 24:
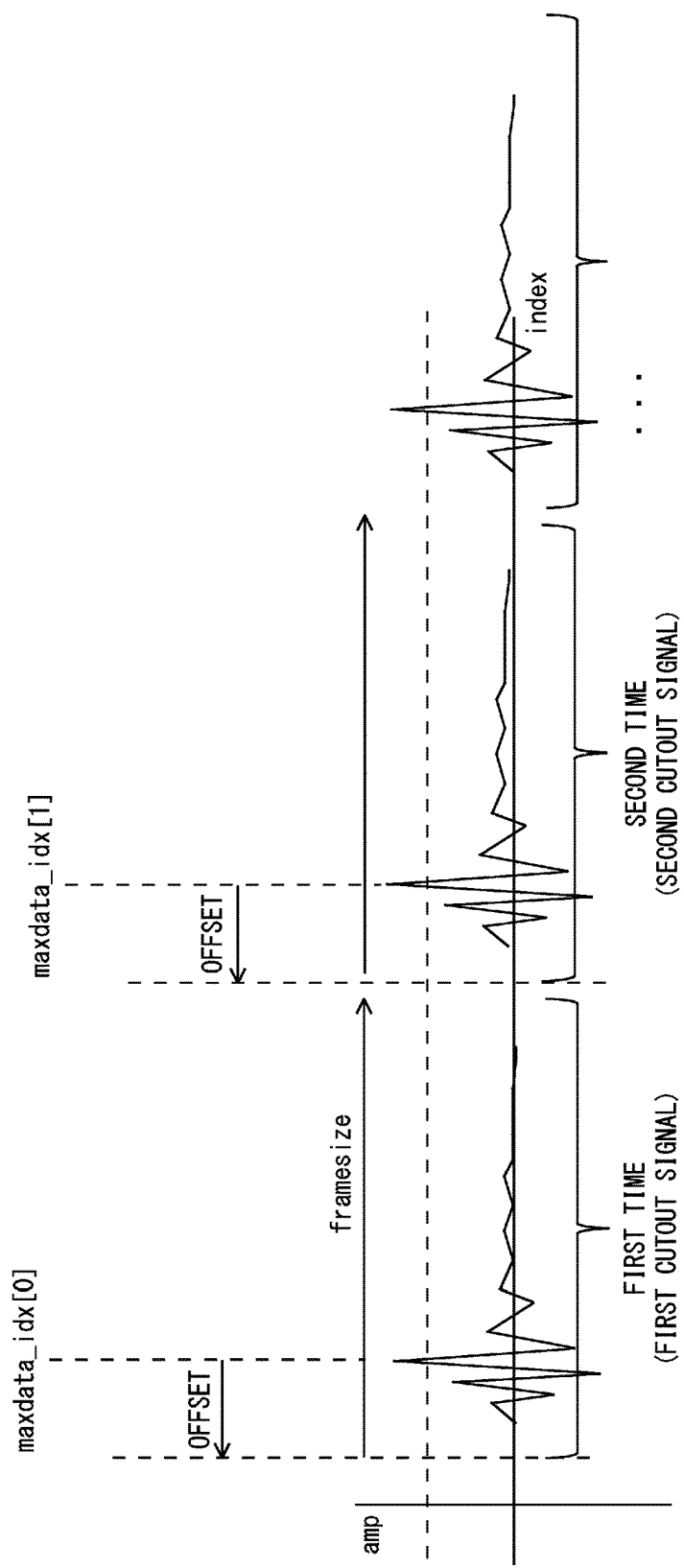
FIG. 24 is a signal waveform diagram illustrating addition processing in the addition processing unit.

To be specific, the peak detection unit 311 obtains all of positive peaks having positive amplitudes and negative peaks having negative amplitudes in the sound pickup signal dataL during the whole sound pick up time. The peak detection unit 311 then leaves the values of positive amplitudes and replaces the values of negative amplitudes with 0 in the entire sound pickup signal dataL. The positive peak sequence pdata is thereby obtained. The positive peak sequence as shown in FIG. 19 is obtained when the sound pickup signal dataL as shown in FIG. 24 is acquired.

Further, the peak detection unit 311 replaces the values of positive amplitudes with 0 and replaces the values of negative amplitudes with their absolute values for all the peaks of the sound pickup signal dataL. The negative peak sequence mdata is thereby obtained.

When the measurement signal is not output from the left speaker 5L (No in S401), the peak detection unit 311 obtains the positive peak sequence pdata and the negative peak sequence mdata of a sound pickup signal dataR based on the sound pickup signal dataR, in the same manner as in S402 (S403). Note that the sound pickup signal dataR is a sound pickup signal acquired when the measurement signal is not output from the right speaker 5R. Thus, by performing the same processing as in Step S402 on the sound pickup signal dataR, the positive peak sequence pdata and the negative peak sequence mdata are obtained.

Then, the sign determination unit 312 determines whether the maximum value pmax of the positive peak sequence pdata is larger than the maximum value mmax of the negative peak sequence mdata (S404). In other words, the sign determination unit 312 compares the maximum value pmax with the maximum value mmax. The sign determination unit 312 determines a sign to be focused on in accordance with a comparison result between the maximum value pmax and the maximum value mmax.

For example, when the maximum value pmax of the positive peak sequence pdata is larger than the maximum value mmax of the negative peak sequence mdata (Yes in S404), the peak group separation unit 313 generates a peak sequence Thdata from the positive peak sequence pdata (S405). Specifically, the sign determination unit 312 determines a positive sign as a sign to be focused on because the maximum value pmax is larger than the maximum value mmax. Then, the peak group separation unit 313 compares an amplitude included in the positive peak sequence pdata with a threshold and generates the peak sequence Thdata. To be specific, when the amplitude of a peak included in the positive peak sequence pdata is equal to or larger than a threshold, the peak group separation unit 313 leaves the value of the amplitude, and when the amplitude is smaller than the threshold, it replaces the value of the amplitude with 0. The peak sequence Thdata is generated in this manner.

Figure 20:
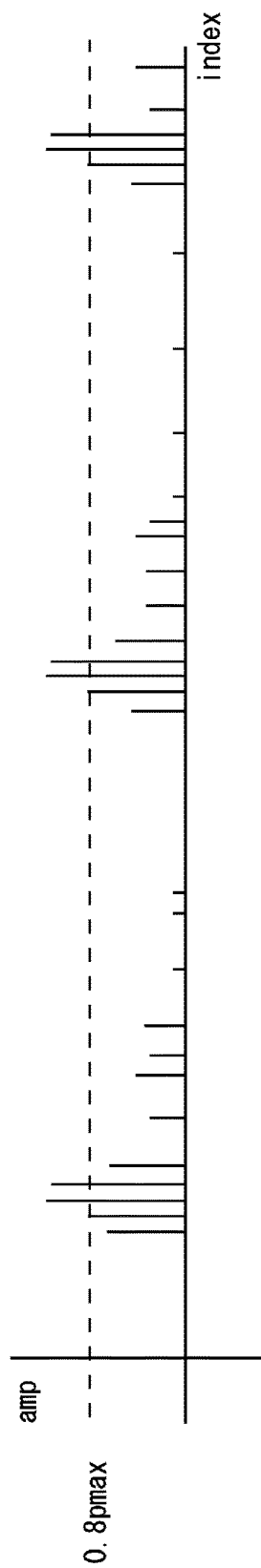
FIG. 20 is a signal waveform diagram illustrating addition processing in the addition processing unit.
Figure 21:
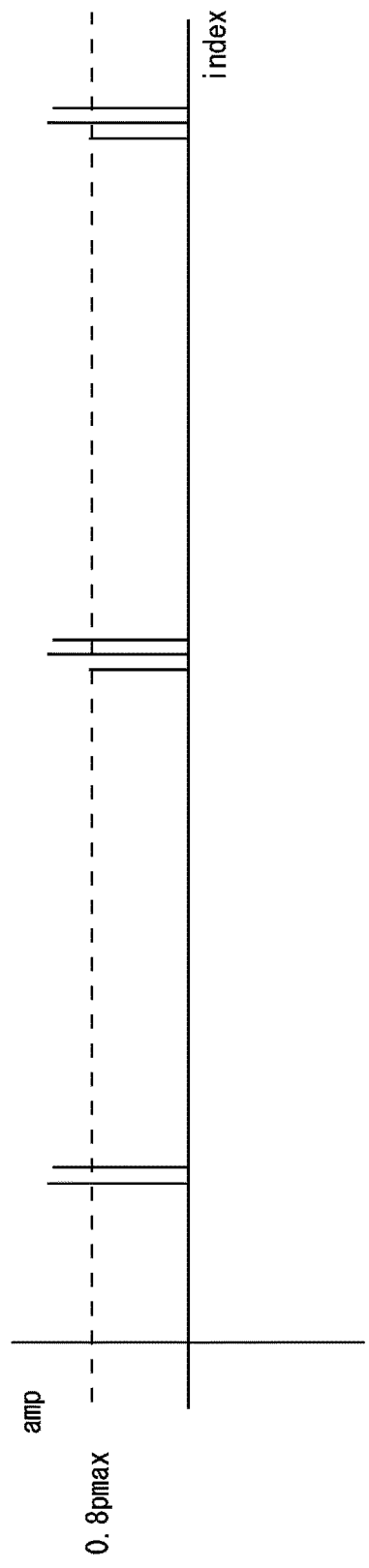
FIG. 21 is a signal waveform diagram illustrating addition processing in the addition processing unit.

Note that the threshold is preferably set in accordance with pmax, and the threshold is pmax*0.8 in this example. FIG. 20 shows the case where the threshold for the positive peak sequence pdata is pmax*0.8. FIG. 21 shows the result when the peak group separation unit 313 replaces the value of an amplitude at a peak smaller than the threshold (pmax*0.8) with 0.

When, on the other hand, the maximum value pmax of the positive peak sequence pdata is equal to or smaller than the maximum value mmax of the negative peak sequence mdata (No in S404), the peak group separation unit 313 generates a peak sequence Thdata from the negative peak sequence mdata, in the same manner as in Step S405 (S406). Specifically, the sign determination unit 312 determines a negative sign as a sign to be focused on because the maximum value mmax is larger than the maximum value pmax. Then, the peak group separation unit 313 compares an amplitude included in the negative peak sequence mdata with a threshold and generates the peak sequence Thdata. When the amplitude of a peak included in the negative peak sequence mdata is equal to or larger than a threshold, the peak group separation unit 313 leaves the value of the amplitude, and when the amplitude is smaller than the threshold, it replaces the value of the amplitude with 0.

The peak sequence Thdata is generated in this manner. Note that the threshold is preferably set in accordance with mmax, and the threshold is mmax *0.8 in this example. As described above, the peak group separation unit 313 generates the peak sequence Thdata based on the peak sequence of the sign determined by the sign determination unit 312.

After generating the peak sequence Thdata in Step S405 or Step S406, the peak group separation unit 313 sets the sample position i=0 and the perk group order j=0 (S407). The peak group separation unit 313 then separates the peak sequence Thdata into a plurality of peak groups, and the maximum amplitude detection unit 314 detects the maximum amplitude of each peak group (S408).

Figure 22:
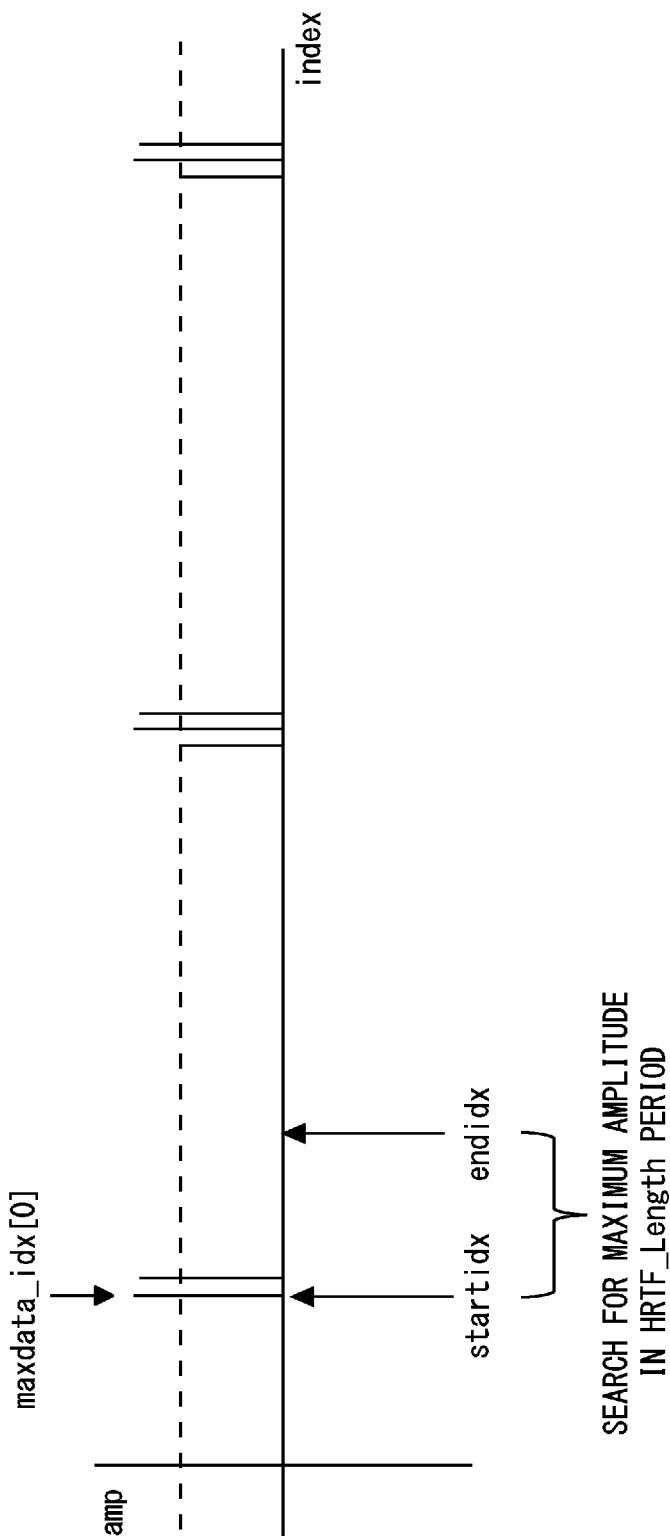
FIG. 22 is a signal waveform diagram illustrating addition processing in the addition processing unit.
Figure 23:
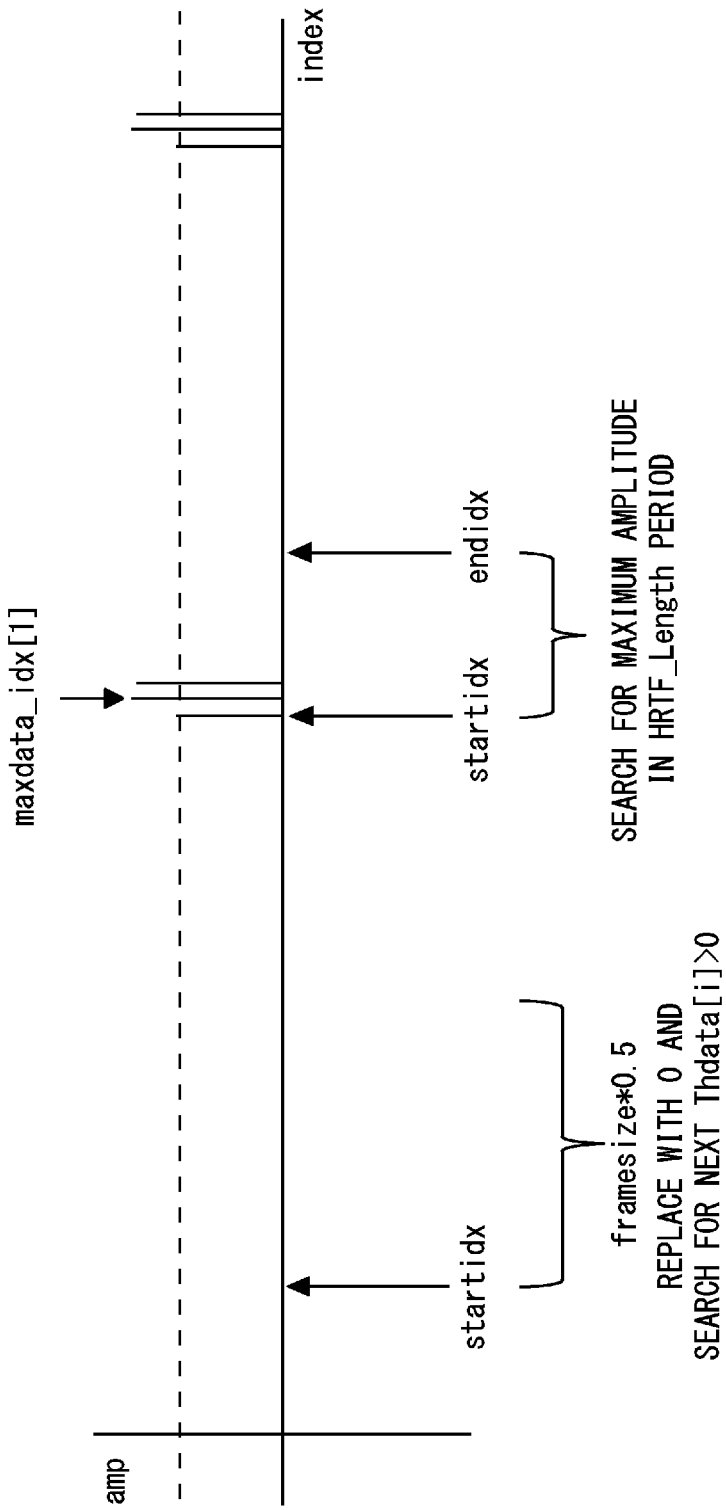
FIG. 23 is a signal waveform diagram illustrating addition processing in the addition processing unit.

To be specific, i is incremented, i where Thdata[i]>0 is set as startidx, endidx=startidx+HRTF Length, and the index idx of the maximum amplitude in the period of startidx to endidx is set to maxdata_idx[j] (see FIG. 22). Note that j=0 in FIG. 22. Further, Thdata from startidx to startidx+framesize*0.5 is replaced with 0. The peak sequence Thdata is thereby as shown in FIG. 23.

framesize corresponds to the frame size of transfer characteristics. To be specific, framesize is the number of samples contained in a cutout signal, which is described later. framesize may be smaller than the number of samples corresponding to a time interval between two impulse sounds. framesize*0.5 is equal to or more than HRTF Length. HRTF Length is 256 samples, for example.

In this manner, the peak group separation unit 313 gradually increases i from i=0, and thereby obtains the first peak in the initial peak group (which is referred to hereinafter as the first peak group). The peak group separation unit 313 sets, as the first peak group, a plurality of peaks included in a specified period of time HRTF Length from the first peak. Then, the maximum amplitude detection unit 314 sets the largest amplitude in the first peak group as maxdata$_{13}$ idx[0]. In other words, the maximum amplitude detection unit 314 detects the maximum amplitude maxdata based on the first impulse sound response. After the maximum amplitude detection unit 314 detects the maximum amplitude, the peak group separation unit 313 replaces Thdata from startidx to framesize*0.5 with 0. The peaks included in the first peak group are thereby removed from the peak sequence Thdata. Note that j=0 in the first peak group.

Next, the peak group separation unit 313 determines whether i is smaller than idx last (S409). idx_last is the last index in the peak sequence Thdata, which is, the index at the sound pickup end time of the sound pickup signal. Thus, the peak group separation unit 313 determines whether the entire peak sequence Thdata is separated into peak groups corresponding to the number of additions. When i is smaller than idx last (Yes in S409), i=i+1 and j=j+1 (S410), and the process returns to Step S408.

Returning to Step S408, the peak group separation unit 313 gradually increases i from i=startidx+1, and thereby obtains the first peak in the next peak group (which is referred to hereinafter as the second peak group). The peak group separation unit 313 sets, as the second peak group, a plurality of peaks included in the period HRTF Length from the first peak. The maximum amplitude detection unit 314 sets the largest amplitude in the second peak group as maxdata_idx[1] (see FIG. 23). The maximum amplitude detection unit 314 detects the maximum amplitude based on the second impulse sound response. Note that j=1 in FIG. 23.

After the maximum amplitude detection unit 314 detects the maximum amplitude, the peak group separation unit 313 replaces Thdata from startidx to framesize*0.5 with 0. The peaks included in the second peak group are thereby removed from the peak sequence Thdata. Because framesize*0.5 is equal to or larger than HRTF_Length, the peaks included in the first peak group are not included in the second peak group.

After that, the peak group separation unit 313 and the maximum amplitude detection unit 314 repeat the above processing until i reaches idx_last. Specifically, the peak group separation unit 313 detects the first peak in each peak group and then sets, as one peak group, a plurality of peaks included in a specified period of time HRTF_Length from the first peak.

After the maximum amplitude detection unit 314 obtains the maximum amplitude of the peak group, the peak group separation unit 313 replaces Thdata at framesize*0.5 from the first peak with 0. In this manner, the peak group separation unit 313 separates the peak sequence Thdata into peak groups corresponding to the number of additions, and the maximum amplitude detection unit 314 obtains the maximum amplitude of each peak group. The number of additions is the number of impulse sounds contained in the measurement signal, which is 30, for example. The peak group separation unit 313 separates the peak sequence Thdata into 30 peak groups. Each of the peak groups is composed of a plurality of peaks included in the period HRTF Length from the first peak.

In the latter part of each impulse response, the peak sequence Thdata is likely to be 0 due to amplitude attenuation. Specifically, because the amplitude attenuates in the latter part of each impulse response, the positive peak sequence pdata and the negative peak sequence mdata are likely to fall below a threshold. Thus, in the peak sequence Thdata where a peak smaller than a threshold is 0, the period having a certain number of consecutive 0 is set as the boundary between peak groups. Specifically, the peak group separation unit 313 sets a part where there are no peaks having an amplitude with an absolute value equal to or larger than a threshold for a certain period of time as the boundary between peak groups. It is thereby possible to appropriately set the boundary of each impulse response.

Then, when i becomes equal to or larger than idx_last (No in S409), the signal cutout unit 315 applies an offset to maxdata_id[j] and cuts out the sound pickup signal, and the signal adding unit 316 adds the cutout signals corresponding to the number of additions. (S411). When the offset is −100 samples, for example, maxdata_idx[j]−100 is the cutout start time. Then, the signal cutout unit 315 cuts out the amplitude corresponding to framesize from the cutout start time, and thereby one cutout signal is generated. The signal cutout unit 315 generates a cutout signal for each of maxdata_idx[j].

The signal adding unit 316 adds the cutout signals corresponding to the number of additions. To be specific, the sample position i=0 and the peak group order j=0 are set as initial values, i is incremented within the range where i is less than framesize, and processing of dataL[i]=dataL[i]+dataL[max_data_idx[j]+OFFSET+i] is performed with each value of i and j. Then, j is incremented within the range where j is less than number of additions, and the same processing is performed. For the right sound pickup signal also, processing of dataR[i]=dataR[i]+dataR[max_data_idx[j]+OFFSET+i] is performed.

As described above, the index to which an offset is applied to the index maxdata_idx[j] of the maximum amplitude is the cutout start time. It is thereby possible to set the appropriate cutout timing even when the first peak in a peak group does not have the maximum amplitude.

Then, the signal cutout unit 315 cuts out samples corresponding to framesize from the cutout start time and thereby generates a cutout signal. The cutout signal that is cut out with a certain framesize is thereby generated as shown in FIG. 24. A cutout signal (first cutout signal) that picks up the first impulse sound and a cutout signal (second cutout signal) that picks up the second impulse sound are shown in FIG. 24.

The signal adding unit 316 adds the cutout signals corresponding to the number of additions as described above. Then, the signal adding unit 316 divides a sum signal which is the sum of the cutout signals corresponding to the number of additions by the number of additions (S412). To be specific, the sample position i=0 is set as an initial value, i is incremented within the range where i is less than framesize, and processing of dataL[i]=dataL[i]/total_times and dataR[i]=dataR[i]/total_times is performed with each value of i. total_times is the number of additions.

Then, the signal adding unit 316 determines whether the addition processing has ended for the sound pickup signal at the right speaker 5R (S413). When the addition processing has not ended for the sound pickup signal at the right speaker 5R (No S413), the process returns to Step S401. The addition processing is thereby performed in the same way for the sound pickup signal of the right speaker 5R. When the addition processing has ended for the sound pickup signal at the right speaker 5R (Yes S413), the signal addition process ends.

As described above, the addition processing unit 213 performs addition processing, which corresponds to synchronous addition, on a sound pickup signal. In this embodiment, a positive or negative sign is determined, and a peak with the determined sign is focused on. Specifically, when a positive sign is focused on, the cutout start positions are aligned so that the maximum amplitudes of positive peaks match. Further, when a negative sign is focused on, the cutout start positions are aligned so that the maximum amplitudes of negative peaks match. It is thereby possible to add the cutout signals that are aligned at the appropriate timing. This improves the S/N ratio.

In the measurement device and the measurement method according to this embodiment, it is possible to appropriately measure transfer characteristics. Further, there is no need to synchronize the microphones 2 and the speakers 5. It is thus possible to measure the transfer characteristics by using low-cost PC or general acoustic equipment with input/output. Many users can thereby use out-of-head localization headphones using personal characteristics.

The sign determination unit 312 determines the sign by comparing the maximum value of the amplitude of a positive peak and the maximum value of the absolute value of the amplitude of a negative peak in the sound pickup signal. It is thereby possible to appropriately determine a sign to be focused on. It is thus possible to appropriately measure transfer characteristics.

The peak group separation unit 313 obtains the first peak in the peak group from peaks having an amplitude with an absolute value equal to or larger than a threshold in the peak sequence, and sets the peaks included in a specified period of time from the first peak as one peak group. The peak group separation unit 313 can thereby appropriately separate the sound pickup signal into a plurality of peak groups. Further, the peak group separation unit 313 sets a part where there are no peaks having an amplitude with an absolute value equal to or larger than a threshold for a certain period of time in the peak sequence as the boundary between a plurality of peak groups. The peak group separation unit 313 can thereby more appropriately separate the sound pickup signal into a plurality of peak groups. It is thereby possible to appropriately measure transfer characteristics.

Then, the direct sound arrival time search unit 214 searches for the direct sound arrival times of the transfer characteristics Hls and Hrs on which the addition processing has been performed. The direct sound is a sound that directly arrives at the left microphone 2L from the left speaker 5L and a sound that directly arrives at the right microphone 2R from the right speaker 5R. Specifically, the direct sound is a sound that arrives at the microphones 2L and 2R from the speakers 5L and 5R without being reflected off a surrounding structural object such as a wall, floor, ceiling, and ear canal. Normally, the direct sound is a sound that arrives at the microphones 2L and 2R at the earliest time. The direct sound arrival time corresponds to the time that has passed from the start of measurement to the arrival of the direct sound. Note that the measurement start position is an index corresponding to the above-described cutout start position, which is i=0 in this example.

To be more specific, the direct sound arrival time search unit 214 searches for the direct sound arrival times based on the times when the amplitudes of the transfer characteristics Hls and Hrs reaches their maximum. Note that processing of the direct sound arrival time search unit 214 is described later. The direct sound arrival time search unit 214 outputs the searched direct sound arrival times to the left and right direct sound determination unit 215.

The left and right direct sound determination unit 215 determines whether the signs of the amplitudes of left and right direct sounds match or not by using the direct sound arrival times searched by the direct sound arrival time search unit 214. For example, the left and right direct sound determination unit 215 determines whether the signs of the amplitudes of the transfer characteristics Hls and Hrs at the direct sound arrival time match or not. Further, the left and right direct sound determination unit 215 determines whether the direct sound arrival times coincide or not. The left and right direct sound determination unit 215 outputs a determination result to the error correction unit 216.

When the signs of the amplitudes of the transfer characteristics Hls and Hrs at the direct sound arrival time are not the same, the error correction unit 216 corrects the cutout timing. Then, the waveform cutout unit 217 cuts out the waveforms of the transfer characteristics Hls, Hlo, Hro and Hrs at the corrected cutout timing. The transfer characteristics Hls, Hlo, Hro and Hrs that are cut out with a specified filter length serve as filters. Specifically, the waveform cutout unit 217 cuts out the waveforms of the transfer characteristics Hls, Hlo, Hro and Hrs by shifting the head position. When the signs of the amplitudes of the transfer characteristics Hls and Hrs at the direct sound arrival time match, the waveform cutout unit 217 cuts out their waveforms without correcting the cutout timing.

To be specific, when the signs of the amplitudes of the transfer characteristics Hls and Hrs are different, the error correction unit 216 corrects the cutout timing so that the direct sound arrival times of the transfer characteristics Hls and Hrs coincide with each other. Data of the transfer characteristics Hls and Hlo or the transfer characteristics Hro and Hrs are shifted so that the direct sounds of the transfer characteristics Hls and Hrs are at the same sample number. Specifically, the head sample number for cutout is made different between the transfer characteristics Hls and Hlo and the transfer characteristics Hro and Hrs.

Then, the waveform cutout unit 217 generates filters from the cut out transfer characteristics Hls, Hlo, Hro and Hrs. Specifically, the waveform cutout unit 217 sets the amplitudes of the transfer characteristics Hls, Hlo, Hro and Hrs as the filter coefficient and thereby generates filters. The transfer characteristics Hls, Hlo, Hro and Hrs generated by the waveform cutout unit 217 are set, as filters, to the convolution calculation units 11, 12, 21 and 22 shown in FIG. 1. The user U can thereby listen to the audio on which the out-of-head localization is carried out with the sound quality with a good balance between left and right.

Figure 25:
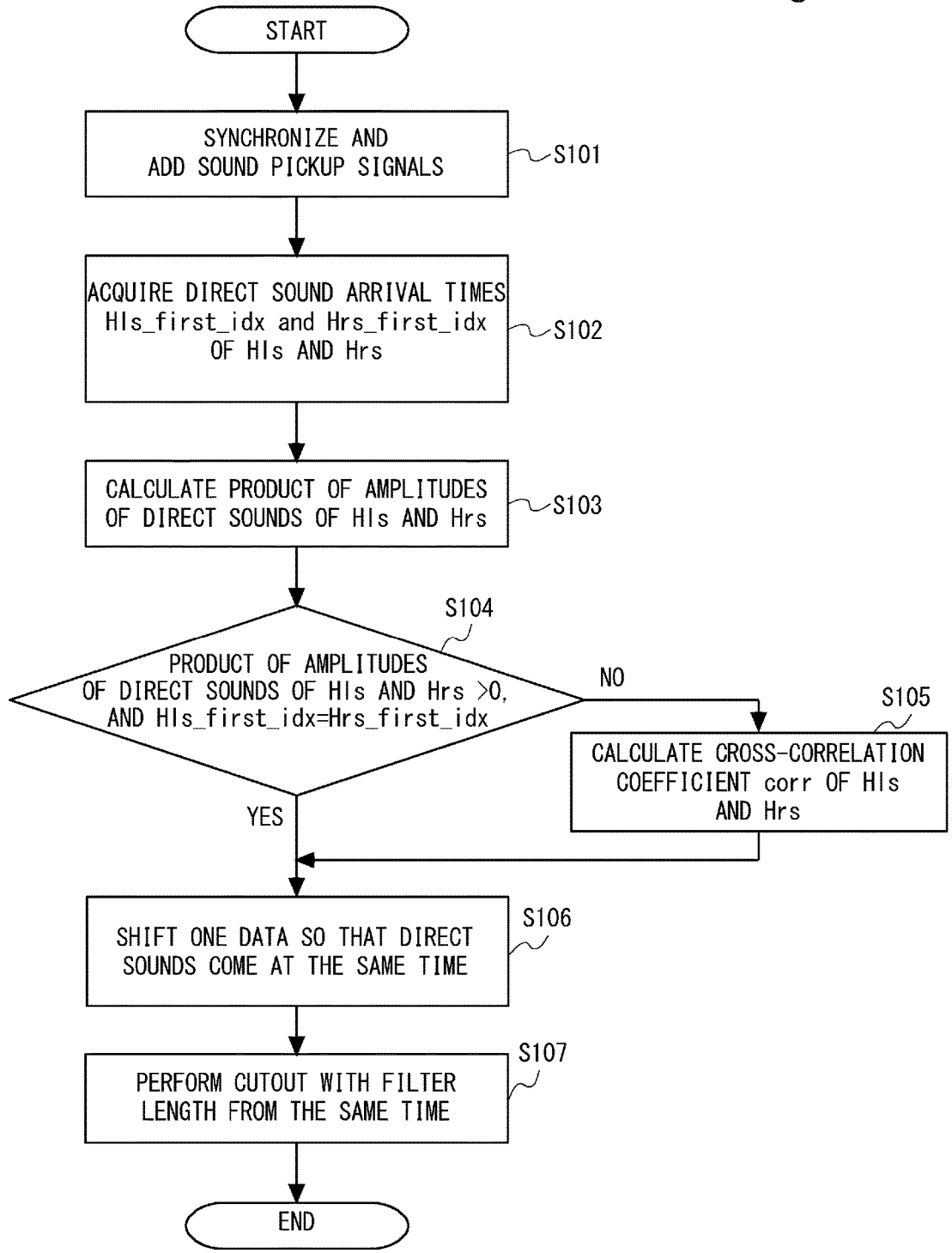
FIG. 25 is a flowchart showing a filter generation method.

A filter generation method by the processor 210 is described hereinafter in detail with reference to FIG. 25. FIG. 25 is a flowchart showing a filter generation method by the processor 210.

First, the addition processing unit 213 performs addition processing of the sound pickup signal (S101). Specifically, the addition processing unit 213 performs addition processing of the sound pickup signal for each of the transfer characteristics Hls, Hlo, Hro and Hrs. It is thereby possible to reduce the effect of unexpected noise. In this step, the addition processing is performed by the process shown in FIGS. 16 to 24.

Then, the direct sound arrival time search unit 214 acquires the direct sound arrival time Hls_First_idx in the transfer characteristics Hls and the direct sound arrival time Hrs_First_idx in the transfer characteristics Hrs (S102).

Figure 26:
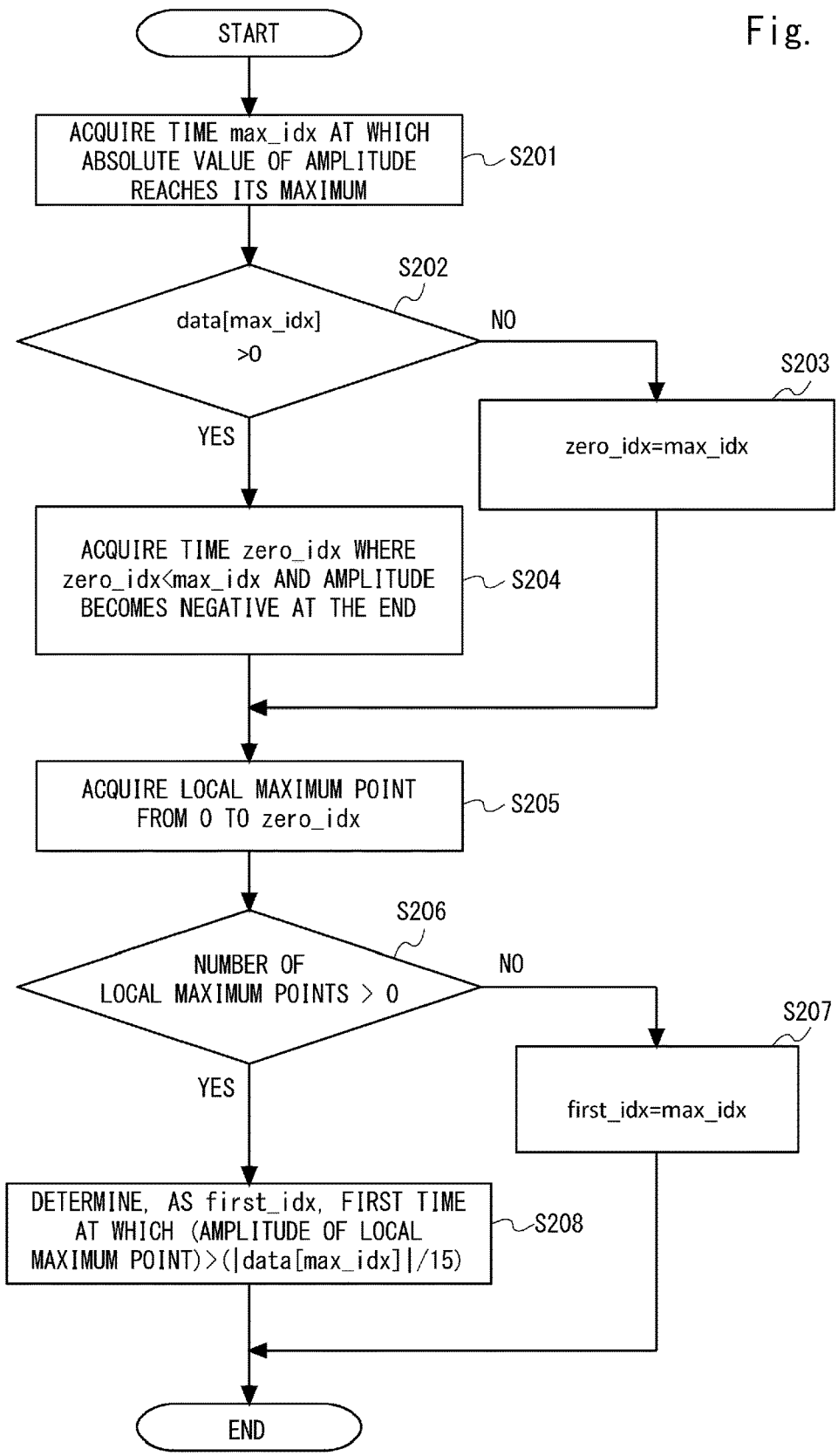
FIG. 26 is a flowchart showing a direct sound search process.

A search process of the direct sound arrival time in the direct sound arrival time search unit 214 is described hereinafter in detail with reference to FIG. 26. FIG. 26 is a flowchart showing a search process of the direct sound arrival time. Note that FIG. 26 shows a process to be performed for each of the transfer characteristics Hls and the transfer characteristics Hrs. Specifically, the direct sound arrival time search unit 214 carries out the process shown in FIG. 26 for each of the transfer characteristics Hls and Hrs and thereby acquires the direct sound arrival time Hls First idx and the direct sound arrival time Hrs_First_idx, respectively.

First, the direct sound arrival time search unit 214 acquires the time max_idx at which the absolute value of the amplitude of the transfer characteristics reaches its maximum (S201). Specifically, the direct sound arrival time search unit 214 sets the time max_idx to the time at which the maximum amplitude A is reached as shown in FIGS. 9 to 12. The time max_idx corresponds to the time elapsed from the start of measurement. Further, the time max_idx and the various times described later may be represented as an absolute time from the start of measurement, or may be represented as the sample number from the start of measurement.

Next, the direct sound arrival time search unit 214 determines whether data[max_idx] at the time max_idx is greater than 0 (S202). data[max_idx] is the value of the amplitude of the transfer characteristics at max_idx. In other words, the direct sound arrival time search unit 214 determines whether the maximum amplitude is a positive peak or a negative peak. When data[max_idx] is negative (No in S202), the direct sound arrival time search unit 214 sets zero_idx=max_idx (S203). In the amplitude Hrs shown in FIG. 12, because the maximum amplitude A is negative, max_idx=zero_idx.

zero_idx is the time as a reference of the search range of the direct sound arrival time. To be specific, the time zero_idx corresponds to the end of the search range. The direct sound arrival time search unit 214 searches for the direct sound arrival time within the range of 0 to zero_idx.

When data[max_idx] is positive (Yes in S202), the direct sound arrival time search unit 214 acquires the time zero_idx where zero_idx<max_idx and the amplitude becomes negative at the end (S204). Specifically, the direct sound arrival time search unit 214 sets, as zero_idx, the time at which the amplitude becomes negative immediately before the time max_idx. For example, in the transfer characteristics shown in FIGS. 9 to 11, because the maximum amplitude A is positive, zero_idx exists before the time max_idx. Although the time at which the amplitude becomes negative immediately before the time max_idx is the end of the search range in this example, the end of the search range is not limited thereto.

When zero_idx is set in Step S203 or S204, the direct sound arrival time search unit 214 acquires the local maximum point from 0 to zero_idx (S205). Specifically, the direct sound arrival time search unit 214 extracts the positive peak of the amplitude in the search range 0 to zero_idx.

The direct sound arrival time search unit 214 determines whether the number of local maximum points is greater than 0 (S206). Specifically, the direct sound arrival time search unit 214 determines whether the local maximum point (positive peak) exists in the search range 0 to zero_idx.

When the number of local maximum points is equal to or smaller than 0 (No in S206), which is, when the local maximum point does not exist in the search range 0 to zero_idx, the direct sound arrival time search unit 214 sets first_idx=max_idx. first_idx is the direct sound arrival time. For example, in the transfer characteristics Hls and Hrs shown in FIGS. 11 and 12. the local maximum point does not exist in the range of 0 to zero_idx. Thus, the direct sound arrival time search unit 214 sets the direct sound arrival time first_idx=max_idx.

When the number of local maximum points is greater than 0 (Yes in S206), which is, when the local maximum point exists in the search range 0 to zero_idx, the direct sound arrival time search unit 214 sets, as the direct sound arrival time first_idx, the first time at which the amplitude of the local maximum point becomes greater than (|data[max_idx]|/15) (S208). Specifically, the positive peak at the earliest time in the search range 0 to zero_idx, which is the peak higher than a threshold (1/15 of the absolute value of the maximum amplitude in this example), is set as the direct sound. For example, in the transfer characteristics shown in FIGS. 9 and 10. the local maximum points C and D exist within the search range 0 to zero_idx. Further, the amplitude of the first local maximum point C is greater than the threshold. Thus, the direct sound arrival time search unit 214 sets the time of the local maximum point C to the direct sound arrival time first_idx.

When the amplitude of the local maximum point is small, there is a possibility that it is caused by noise or the like. It is thus required to determine whether the local maximum point is caused by noise or direct sounds from speakers. Therefore, in this embodiment, (absolute value of data [max_idx]/15 is set as a threshold, and the local maximum point that is greater than this threshold is determined to be direct sounds. In this manner, the direct sound arrival time search unit 214 sets the threshold in accordance with the maximum amplitude.

Then, the direct sound arrival time search unit 214 compares the amplitude of the local maximum point with the threshold, and thereby determines whether the local maximum point is caused by noise or by direct sounds. Specifically, when the amplitude of the local maximum point is less than a specified proportion of the absolute value of the maximum amplitude, the direct sound arrival time search unit 214 determines the local maximum point as noise. When, on the other hand, the amplitude of the local maximum point is equal to or more than a specified proportion of the absolute value of the maximum amplitude, the direct sound arrival time search unit 214 determines the local maximum point as direct sounds. The effect of noise is thereby removed, and it is thus possible to accurately search for the direct sound arrival time.

The threshold for determining noise is not limited to the above-described value as a matter of course, and an appropriate proportion may be set in accordance with the measurement environment, measurement signals and the like. Further, the threshold may be set regardless of the maximum amplitude.

The direct sound arrival time search unit 214 calculates the direct sound arrival time first_idx as described above. To be specific, the direct sound arrival time search unit 214 sets, as the direct sound arrival time first_idx, the time when the amplitude is the local maximum point before the time max_idx at which the absolute value of the amplitude is maximum. Specifically, the direct sound arrival time search unit 214 determines the first positive peak before the maximum amplitude as direct sounds. When the local maximum point does not exist before the maximum amplitude, the direct sound arrival time search unit 214 determines the maximum amplitude as direct sounds. The direct sound arrival time search unit 214 outputs the searched direct sound arrival times first_idx to the left and right direct sound determination unit 215.

Referring back to FIG. 25, the left and right direct sound determination unit 215 acquires the direct sound arrival times Hls first_idx and Hrs first_idx of the transfer characteristics Hls and Hrs, respectively, as described above. The left and right direct sound determination unit 215 calculates the product of the amplitudes of the direct sounds of the transfer characteristics Hls and Hrs (S103). Specifically, the left and right direct sound determination unit 215 multiplies the amplitude of the transfer characteristics Hls at the direct sound arrival time Hls first_idx by the amplitude of the transfer characteristics Hrs at the direct sound arrival time Hrs first_idx, and determines whether the negative/positive signs of the maximum amplitudes of Hls and Hrs match or not.

After that, the left and right direct sound determination unit 215 determines whether (product of amplitudes of direct sounds of transfer characteristics Hls and Hrs)>0 and Hls first_idx=Hrs first_idx are satisfied (S104). In other words, the left and right direct sound determination unit 215 determines whether the signs of the amplitudes of the transfer characteristics Hls and Hrs at the direct sound arrival time match or not. Further, the left and right direct sound determination unit 215 determines whether the direct sound arrival time Hls_first_idx coincides with the direct sound arrival time Hrs_first _idx.

When the amplitudes at the direct sound arrival time match and Hls first_idx coincides with the direct sound arrival time Hrs_first _idx (Yes in S104), the error correction unit 216 shifts one data so that the direct sounds come at the same time (S106). Note that, when the shift of the transfer characteristics is not necessary, the data shift amount is 0. For example, when the determination in Step S104 results in Yes, the data shift amount is 0. In this case, the process may skip Step S106 and proceeds to Step S107. Then, the waveform cutout unit 217 cuts out the transfer characteristics Hls, Hlo, Hro and Hrs with a filter length from the same time (S107).

When the product of the amplitudes of direct sounds of the transfer characteristics Hls and Hrs is negative, or when Hls_first_idx=Hrs_first_idx is not satisfied (No in S104), the error correction unit 216 calculates the cross-correlation coefficient corr of the transfer characteristics Hls and Hrs (S105). Specifically, because left and right direct sound arrival times do not coincide, the error correction unit 216 corrects the cutout timing. Thus, the error correction unit 216 calculates the cross-correlation coefficient corr of the transfer characteristics Hls and Hrs.

Then, the error correction unit 216 shifts one data so that the direct sounds come at the same time based on the cross-correlation coefficient corr (S106). To be specific, data of the transfer characteristics Hrs and Hro are shifted so that the direct sound arrival time Hls_first_idx coincides with the direct sound arrival time Hrs_first_idx. The shift amount of data of the transfer characteristics Hrs and Hro is determined in accordance with the offset amount where the correlation is the highest. In this manner, the error correction unit 216 corrects the cutout timing based on the correlation between the transfer characteristics Hls and Hrs. The waveform cutout unit 217 cuts out the transfer characteristics Hls, Hlo, Hro and Hrs with a filter length (S107).

Figure 27:
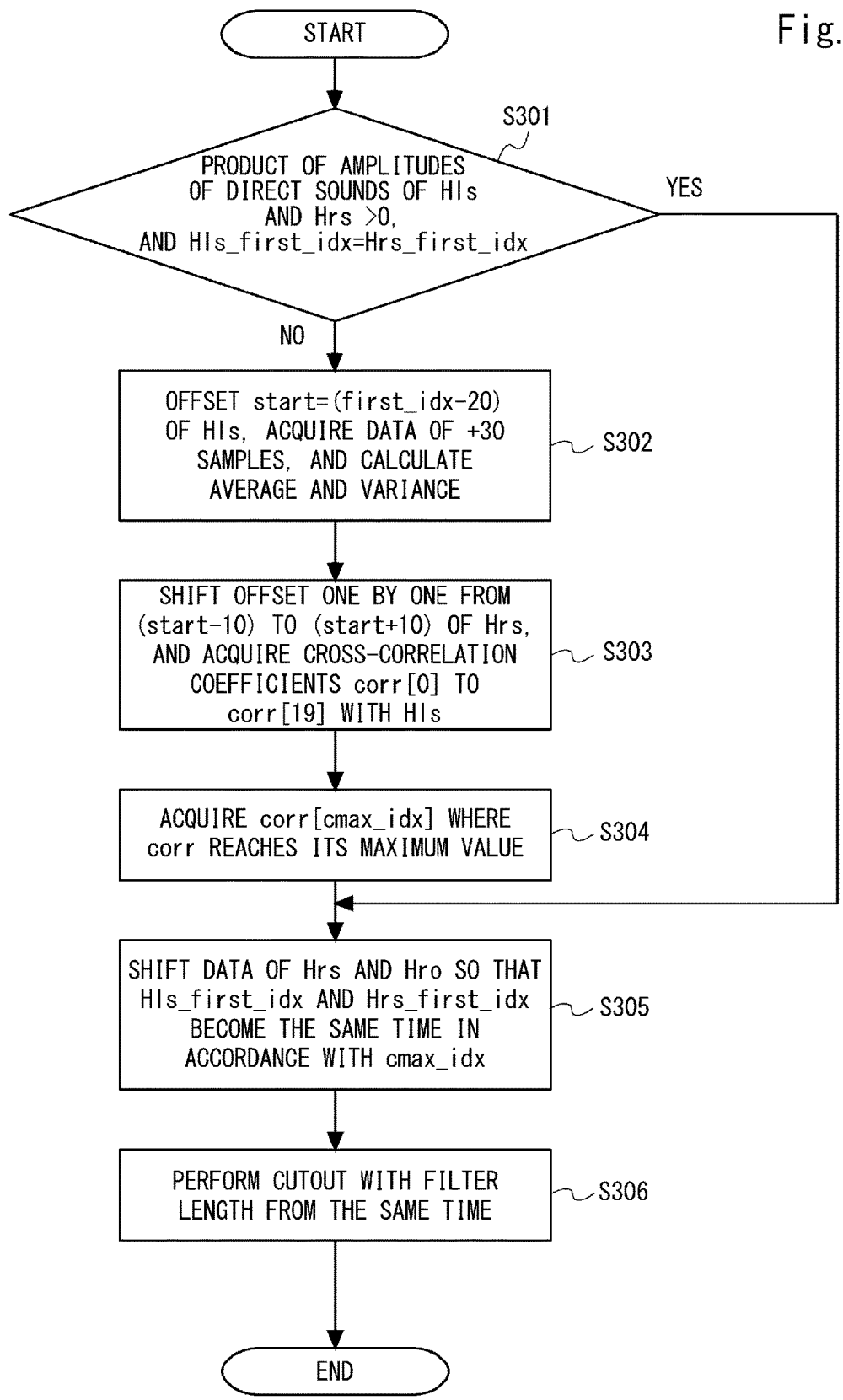
FIG. 27 is a flowchart showing a detailed example of the process shown in FIG. 26.

An example of a process from Steps S104 to S107 is described hereinafter with reference to FIG. 27. FIG. 27 is a flowchart showing an example of a process from Steps S104 to S107.

First, the left and right direct sound determination unit 215 makes determination on left and right sounds, just like in Step S104. Specifically, the left and right direct sound determination unit 215 determines whether the product of the amplitudes of direct sounds of the transfer characteristics Hls and Hrs>0 and Hls_first_idx=Hrs_first_idx are satisfied or not (S301).

When the product of the amplitudes of direct sounds of the transfer characteristics Hls and Hrs>0 and Hls_first_idx=Hrs_first_idx are satisfied (Yes in S301), the error correction unit 216 shifts the data of the transfer characteristics Hrs and Hro so that Hls_first_idx=Hrs_first_idx are at the same time (S305). Note that, when the shift of the transfer characteristics is not necessary, the data shift amount is 0. For example, when the determination in Step S301 results in Yes, the data shift amount is 0. In this case, the process may skip Step S305 and proceeds to Step S306. Then, the waveform cutout unit 217 cuts out the transfer characteristics Hls, Hlo, Hro and Hrs with a filter length from the same time (S306). Specifically, the error correction unit 216 corrects the cutout timing of the transfer characteristics Hro and Hrs so that the direct sound arrival time coincides with each other. Then, the waveform cutout unit 217 cuts out the transfer characteristics Hls, Hlo, Hro and Hrs at the cutout timing corrected by the error correction unit 216.

When the product of the amplitudes of direct sounds of the transfer characteristics Hls and Hrs<0, or Hls_first_idx=Hrs_first_idx is not satisfied (No in S301), the error correction unit 216 offsets start=(first_idx−20) of the transfer characteristics Hls, acquires data of +30 samples, and calculates the average and variance (S302). Specifically, the error correction unit 216 extracts data of 30 successive samples where the starting point "start" is at 20 samples before the direct sound arrival time first_idx. The error correction unit 216 then calculates the average and variance of the extracted 30 samples. Because the average and variance are used for the standardization of the cross-correlation coefficient, they are not necessarily calculated when the standardization is not needed. Note that the number of samples to be extracted is not limited to 30 samples, and the error correction unit 216 may extract an arbitrary number of samples.

Then, the error correction unit 216 shifts the offset one by one from (start−10) to (start+10) of the transfer characteristics Hrs, and acquires the cross-correlation coefficients corr[0] to corr[19] with the transfer characteristics Hls (S303). Note that the error correction unit 216 preferably standardizes the cross-correlation coefficients corr by using the average and variance of the transfer characteristics Hls and Hrs.

A method of calculating the cross-correlation coefficients is described hereinafter with reference to FIG. 28. In graph (b) of FIG. 28, the transfer characteristics Hls and 30 samples that are extracted from the transfer characteristics Hls are shown in a thick frame G. Further, in graph (a) of FIG. 28, the transfer characteristics Hrs and 30 samples when (start−10) is offset are shown in a thick frame F. Because first_idx−20=start, 30 samples, which begin at first_idx−30, are shown in the thick frame F in graph (a) of FIG. 28.

Figure 28:
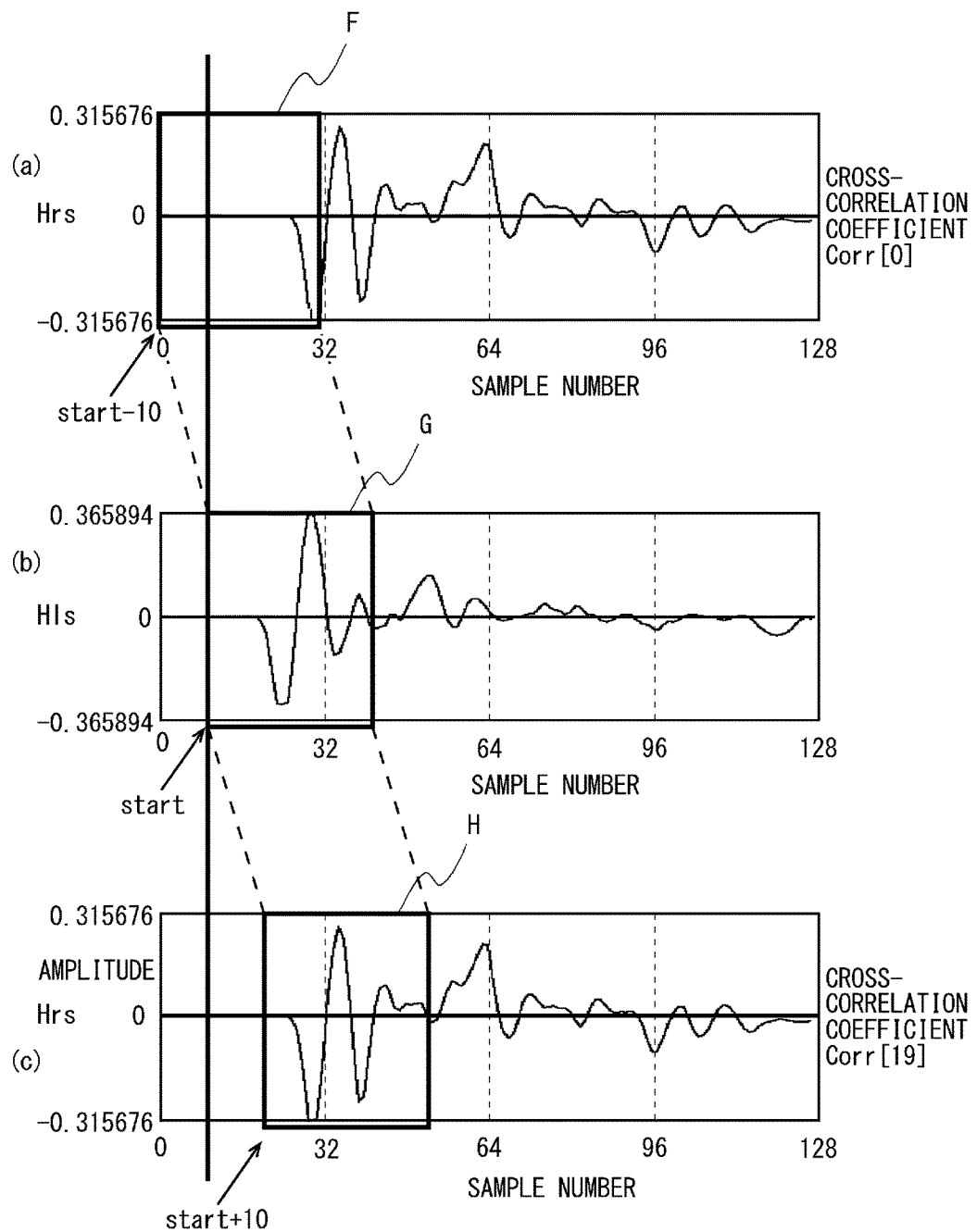
FIG. 28 is a view illustrating a process of calculating a cross-correlation coefficient.

Further, in graph (c) of FIG. 28, the transfer characteristics Hrs and 30 samples when (start−10) is offset are shown in a thick frame H. Because first_idx−20=start, 30 samples, which begin at first_idx−10, are shown in the thick frame F in graph (a) of FIG. 28. By calculating the cross-correlation between the 30 samples in the thick frame F and the 30 samples in the thick frame G, the cross-correlation coefficient corr[0] is obtained. Likewise, by calculating the cross-correlation between the thick frame G and the thick frame H, the cross-correlation coefficient corr[19] is obtained. As the cross-correlation coefficient corr is higher, the correlation between the transfer characteristics Hls and Hrs is higher.

The error correction unit 216 acquires corr[cmax_idx] where the cross-correlation coefficient reaches its maximum value (S304). cmax_idx corresponds to the offset amount where the cross-correlation coefficient reaches its maximum value. In other words, cmax_idx indicates the offset amount when the correlation between the transfer characteristics Hls and the transfer characteristics Hrs is the highest.

Then, the error correction unit 216 shifts the data of the transfer characteristics Hrs and Hro so that Hls first_idx and Hrs_first_idx become the same time in accordance with cmax_idx (S305). The error correction unit 216 shifts the data of the transfer characteristics Hrs and Hro by the offset amount. The direct sound arrival times of the transfer characteristics Hls and Hrs thereby coincide with each other. Note that Step S305 corresponds to Step S106 in FIG. 25. Further, the error correction unit 216 may shift the transfer characteristics Hls and Hlo instead of shifting the transfer characteristics Hrs and Hro.

After that, the waveform cutout unit 217 cuts out the transfer characteristics Hls, Hlo, Hro and Hrs with a filter length from the same time. It is thereby possible to generate filters where the direct sound arrival times coincide. It is thus possible to generate sound fields with a good balance between left and right. The vocal sound image can be thereby localized at the center.

Figure 29A:
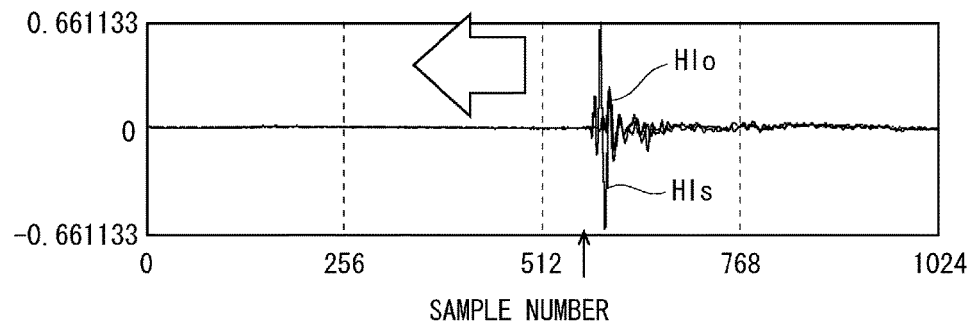
FIG. 29A is a view illustrating a delay by an acoustic device.
Figure 29B:
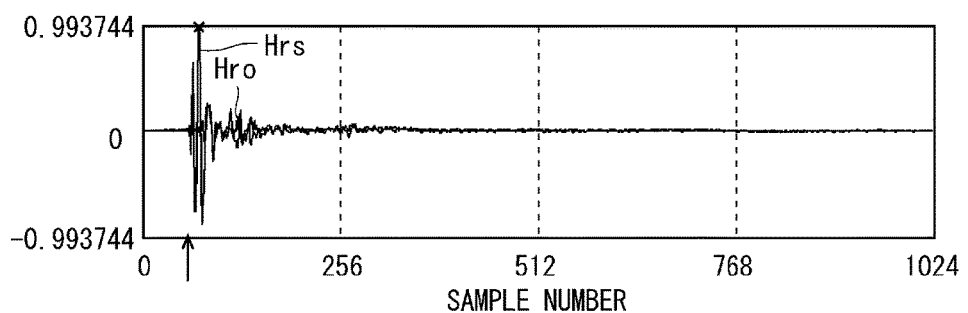
FIG. 29B is a view illustrating a delay by an acoustic device.
Figure 29C:
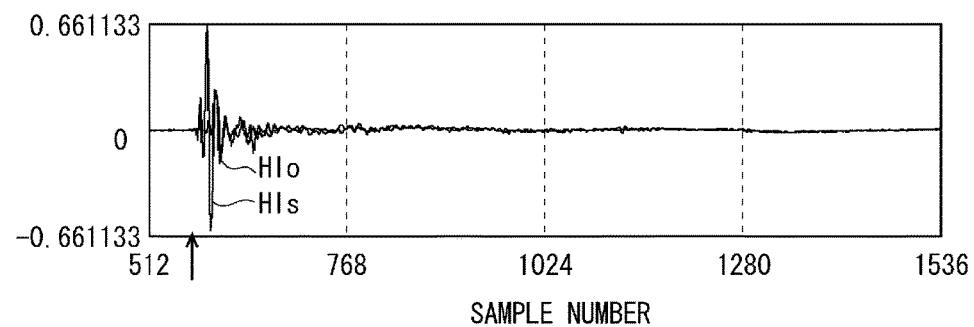
FIG. 29C is a view illustrating a delay by an acoustic device.

The significance of making the direct sound arrival times coincide with each other is described hereinafter with reference to FIGS. 29A to 29C. FIG. 29A is a view showing the transfer characteristics Hls and Hlo before the direct sound arrival times coincide. FIG. 29B is a view showing the transfer characteristics Hrs and Hro. FIG. 29C is a view showing the transfer characteristics Hls and Hlo after the direct sound arrival times coincide. In FIGS. 29A to 29C, the horizontal axis indicates the sample number, and the vertical axis indicates the amplitude. The sample number corresponds to the time elapsed from the start of measurement, and the measurement start time is the sample number 0.

For example, there is a case where the amount of delay in the acoustic device differs between impulse response measurement from the left speaker 5L and impulse response measurement from the right speaker 5R. In this case, the direct sound arrival times of the transfer characteristics Hls and Hlo shown in FIG. 29A delay behind the transfer characteristics Hrs and Hro shown in FIG. 29B. In such a case, if the transfer characteristics Hls, Hlo, Hro and Hrs are cut out without making the direct sound arrival times coincide with each other, sound fields with a poor balance between left and right are generated. To avoid this, as shown in FIG. 29C, the processor 210 shifts the transfer characteristics Hls and Hlo based on the correlation. The direct sound arrival times of the transfer characteristics Hls and Hrs can thereby coincide with each other.

Then, the processor 210 cuts out the transfer characteristics with the direct sound arrival times coinciding with each other and thereby generates filters. Specifically, the waveform cutout unit 217 cuts out the transfer characteristics where the direct sound arrival times coincide with each other and thereby generates filters. It is thereby possible to reproduce the sound fields with a good balance between left and right.

In this embodiment, the left and right direct sound determination unit 215 determines whether the signs of direct sounds match or not. In accordance with the determination result of the left and right direct sound determination unit 215, the error correction unit 216 performs error correction. To be specific, when the signs of direct sounds do not match, or the direct sound arrival times do not coincide, the error correction unit 216 performs error correction based on the cross-correlation coefficient. When, on the other hand, the signs of direct sounds match, and the direct sound arrival times coincide, the error correction unit 216 does not perform error correction based on the cross-correlation coefficient. Because the frequency that the error correction unit 216 performs error correction is low, it is possible to eliminate unnecessary calculations. Specifically, the error correction unit 216 does not need to calculate the cross-correlation coefficient when the signs of direct sounds match and the direct sound arrival times coincide. It is thereby possible to reduce the calculation time.

Normally, error correction by the error correction unit 216 is not needed. However, there are cases where the characteristics of the left and right speakers 5L and 5R are different or where surrounding reflections are largely different between left and right. There is also a case where the positions of the microphones 2L and 2R are not aligned between the left ear 9L and the right ear 9R. Further, there is a case where the amount of delay of the acoustic device is different. In those cases, it is not possible to appropriately pick up the measurement signals, and the timing is off between left and right. In this embodiment, the error correction unit 216 performs error correction, and thereby generates filters appropriately. It is thereby possible to reproduce the sound fields with a good balance between left and right.

Further, the direct sound arrival time search unit 214 searches for the direct sound arrival time. To be specific, the direct sound arrival time search unit 214 sets, as the direct sound arrival time, the time when the amplitude is the local maximum point before the time with the maximum amplitude. When the local maximum point does not exist before the time with the maximum amplitude, the direct sound arrival time search unit 214 sets the time with the maximum amplitude as the direct sound arrival time. It is thereby possible to appropriately search for the direct sound arrival time. The transfer characteristics are then cut out based on the direct sound arrival time, and it is thus possible to generate filters more appropriately.

The left and right direct sound determination unit 215 determines whether the signs of the amplitudes of the transfer characteristics Hls and Hrs at the direct sound arrival time match. When the signs do not match, the error correction unit 216 corrects the cutout timing. It is thereby possible to appropriately adjust the cutout timing. Further, the left and right direct sound determination unit 215 determines whether the direct sound arrival times of the transfer characteristics Hls and Hrs coincide. When the direct sound arrival times of the transfer characteristics Hls and Hrs do not coincide, the error correction unit 216 corrects the cutout timing. It is thereby possible to appropriately adjust the cutout timing.

When the signs of the amplitudes of the transfer characteristics Hls and Hrs at the direct sound arrival time match and the direct sound arrival times of the transfer characteristics Hls and Hrs coincide, the shift amount of the transfer characteristics is 0. In this case, the error correction unit 216 may skip the processing of correcting the cutout timing. To be specific, when Step S104 results in Yes, Step S106 may be skipped. Alternatively, when Step S301 results in Yes, Step S305 may be skipped. It is thereby possible to eliminate unnecessary processing and reduce the calculation time.

The error correction unit 216 preferably corrects the cutout timing based on the correlation between the transfer characteristics Hls and Hrs. The direct sound arrival times can thereby coincide with each other appropriately. It is thereby possible to reproduce sound fields with a good balance between left and right.

It should be noted that, although the out-of-head localization device that localizes sound images outside the head by using headphones is described as a sound localization device in the above embodiment, this embodiment is not limited to the out-of-head localization device. For example, it may be used for a sound localization device that reproduces stereo signals from the speakers 5L and 5R and localizes sound images. Specifically, this embodiment is applicable to a sound localization device that convolves transfer characteristics to reproduced signals. For example, sound localization filters in virtual speakers, near speaker surround systems or the like can be generated.

Further, the addition processing unit 213 that performs processing corresponding to synchronous addition can function as a measurement device that measures the transfer characteristics of speakers and microphones. The positions to place speakers and microphones are not particularly limited, and measurement can be carried out by using speakers and microphones mounted on earphones or the like, for example.

A part or the whole of the above-described signal processing may be executed by a computer program. The above-described program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R , CD-R/W, DVD-ROM (Digital Versatile Disc Read Only Memory), DVD-R (DVD Recordable)), DVD-R DL (DVD-R Dual Layer)), DVD-RW (DVD ReWritable)), DVD-RAM), DVD+R), DVR+R DL), DVD+RW), BD-R (Blu-ray (registered trademark) Disc Recordable)), BD-RE (Blu-ray (registered trademark) Disc Rewritable)), BD-ROM), and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

Although embodiments of the invention made by the present invention are described in the foregoing, the present invention is not restricted to the above-described embodiments, and various changes and modifications may be made without departing from the scope of the invention.

The present application is applicable to a sound localization device that localizes sound images by using transfer characteristics.

What is claimed is:
1. A measurement device comprising:
a measurement unit configured to measure transfer characteristics based on a sound pickup signal, the sound pickup signal being acquired by picking up, using a microphone, a measurement signal output from a sound source, the measurement signal containing a plurality of signal sound in a row with a time interval, wherein the measurement unit includes:
a peak detection unit configured to detect positive and negative peaks included in a sound pickup signal;
a sign determination unit configured to determine a positive or negative sign based on amplitudes at the negative and positive peaks detected by the peak detection unit;
a separation unit configured to separate a peak sequence composed of the peaks with the determined sign into a plurality of peak groups;
a maximum amplitude detection unit configured to detect a maximum amplitude in each of the plurality of peak groups;
a cutout unit configured to cut out the sound pickup signal at cutout timing based on the maximum amplitude and generate a plurality of cutout signals; and
a signal adding unit configured to add the plurality of cutout signals.

2. The measurement device according to claim 1, wherein the sign determination unit determines the sign by comparing a maximum value of the amplitude of the positive peak and a maximum value of an absolute value of the amplitude of the negative peak in the sound pickup signal.

3. The measurement device according to claim 1, wherein the separation unit obtains a first peak in the peak group from peaks having an amplitude with an absolute value equal to or larger than a threshold in the peak sequence, and sets peaks included in a specified period of time from the first peak as one peak group.

4. The measurement device according to claim 3, wherein the separation unit sets a part where the peaks having an amplitude with an absolute value equal to or larger than a threshold do not exist for a certain period of time in the peak sequence as a boundary between the plurality of peak groups.

5. A filter generation device comprising:
the measurement device according to claim 1, wherein
the filter generation device generates a filter based on transfer characteristics measured by the measurement device.

6. A measurement method that measures transfer characteristics by picking up, using a microphone, a measurement signal output from a sound source, the method comprising:
a step of outputting, from the sound source, a measurement signal containing a plurality of signal sounds in a row with a time interval;
a step of picking up, by the microphone, the measurement signal output from the speakers and acquiring a sound pickup signal;
a peak detection step of detecting positive and negative peaks included in the sound pickup signal;
a sign determination step of determining a positive or negative sign based on amplitudes at the negative and positive peaks;
a separation step of separating a peak sequence composed of the peaks with the determined sign into a plurality of peak groups;
a maximum amplitude detection step of detecting a maximum amplitude in each of the plurality of peak groups;
a cutout step of cutting out the sound pickup signal at cutout timing based on the maximum amplitude and generating a plurality of cutout signals; and
a signal adding step of adding the plurality of cutout signals.

7. A filter generation method comprising:
a step of generating a filter by using transfer characteristics measured by the measurement method according to claim 6.

* * * * *